United States Patent
Bauer et al.

(10) Patent No.: US 12,181,387 B2
(45) Date of Patent: Dec. 31, 2024

(54) SYSTEM AND METHOD FOR SAMPLE PRESERVATION

(71) Applicant: Ventana Medical Systems, Inc., Tucson, AZ (US)

(72) Inventors: Daniel Bauer, Tucson, AZ (US); David Chafin, Tucson, AZ (US); Michael Otter, Tucson, AZ (US)

(73) Assignee: Ventana Medical Systems, Inc., Tucson, AZ (US)

( * ) Notice: Subject to any disclaimer, the term of this patent is extended or adjusted under 35 U.S.C. 154(b) by 0 days.

(21) Appl. No.: 18/120,887

(22) Filed: Mar. 13, 2023

(65) Prior Publication Data
US 2023/0213416 A1  Jul. 6, 2023

Related U.S. Application Data

(60) Division of application No. 16/439,751, filed on Jun. 13, 2019, now Pat. No. 11,635,355, which is a
(Continued)

(51) Int. Cl.
*G01N 1/30* (2006.01)
*G01N 1/31* (2006.01)
(Continued)

(52) U.S. Cl.
CPC .............. *G01N 1/30* (2013.01); *G01N 1/31* (2013.01); *G01N 29/024* (2013.01); *G01N 29/07* (2013.01);
(Continued)

(58) Field of Classification Search
CPC ............... G01N 1/30; G01N 2001/302; G01N 2001/305; G01N 2291/02809
See application file for complete search history.

(56) References Cited

U.S. PATENT DOCUMENTS 10,126,216 B2 * 11/2018 Chafin ............... G01N 1/30
10,539,487 B2 *  1/2020 Taft .................. G01N 1/30
(Continued)

FOREIGN PATENT DOCUMENTS

JP  2013521506     6/2013
JP  2014505890 A   3/2014
(Continued)

OTHER PUBLICATIONS

Thavarajah et al. Chemical and Physical basics of routine formaldehyde fixation. Journal of Oral and Maxillofacial Pathology 16 (3) 400-405 (Dec. 2012).*
(Continued)

*Primary Examiner* — Gailene Gabel
(74) *Attorney, Agent, or Firm* — Charney IP Law LLC; Thomas M. Finetti

(57) ABSTRACT

A method is disclosed that permits calculation of reagent concentrations (in SI units) over time and space within a tissue sample as the sample is immersed in the reagent and the reagent diffuses into the tissue sample. The disclosed method has yielded the surprising result that once a formaldehyde concentration at all points within a tissue sample exceeds about 90 mM during a cold step of a cold+hot fixation protocol, the hot step of the fixation protocol can be commenced to provide reliable detection of molecular targets and preservation of tissue morphology in downstream analyses.

5 Claims, 28 Drawing Sheets

Related U.S. Application Data continuation of application No. PCT/US2017/067811, filed on Dec. 21, 2017.

(60) Provisional application No. 62/438,152, filed on Dec. 22, 2016, provisional application No. 62/437,962, filed on Dec. 22, 2016.

(51) Int. Cl.
*G01N 29/024* (2006.01)
*G01N 29/07* (2006.01)
*G01N 29/44* (2006.01)

(52) U.S. Cl.
CPC ..... *G01N 29/4418* (2013.01); *G01N 29/4427* (2013.01); *G01N 29/4472* (2013.01); *G01N 2001/305* (2013.01); *G01N 2291/011* (2013.01); *G01N 2291/023* (2013.01); *G01N 2291/02475* (2013.01); *G01N 2291/02809* (2013.01)

(56) References Cited

U.S. PATENT DOCUMENTS

| 11,624,684 | B2* | 4/2023 | Chafin | G01N 1/30 |
| | | | | 435/40.52 |
| 2007/0243626 | A1 | 10/2007 | Windeyer et al. | |
| 2012/0214195 | A1* | 8/2012 | Chafin | G01N 1/30 |
| | | | | 435/40.52 |
| 2013/0224791 | A1* | 8/2013 | Taft | G01N 29/07 |
| | | | | 435/40.52 |
| 2017/0336303 | A1* | 11/2017 | Chafin | G01N 33/574 |
| 2020/0124506 | A1* | 4/2020 | Taft | G01N 1/30 |
| 2023/0194395 | A1* | 6/2023 | Chafin | G01N 1/30 |
| | | | | 435/40.52 |

FOREIGN PATENT DOCUMENTS

| WO | 2011109769 A1 | 9/2011 |
| WO | 2012110646 A1 | 8/2012 |
| WO | 2016/097166 A1 | 6/2016 |
| WO | 2016097163 A1 | 6/2016 |

OTHER PUBLICATIONS

Lee, J., et al., Gastrointestinal malignancies harbor actionable MET exon 14 deletions, Oncotarget, Sep. 10, 2015, pp. 28211-28222, vol. 6, No. 29.

Park, S., et al., MET amplification, protein expression, and mutations in pulmonary adenocarcinoma, Lung Cancer, 2015, pp. 381-387, vol. 90, No. 3, Elsevier Ireland Ltd.

Togashi, Y., et al., MET gene exon 14 deletion created using the CRISPR/Cas9 system systemenhances cellular growth and sensitivity to a MET inhibitor, Lung Cancer, 2015, pp. 590-597, vol. 90, No. 3, Elsevier Ireland Ltd.

International Search Report and Written Opinion for PCT/US2017/067811, dated Jun. 5, 2018.

* cited by examiner

Avg ρ = 0.1477
Std ρ = 0.0274

SYSTEM AND METHOD FOR SAMPLE PRESERVATION

CROSS REFERENCE TO RELATED APPLICATIONS

The present application is a divisional of Ser. No. 16/439,751 filed on Jun. 13, 2019, which application is a continuation of International Application No. PCT/US17/67811 filed on Dec. 21, 2017, which application claims the benefit of the filing date of U.S. Provisional Patent Application No. 62/437,962, filed Dec. 22, 2016, and the benefit of the filing date of U.S. Provisional Patent Application No. 62/438,152, filed Dec. 22, 2016, the disclosures of which are hereby incorporated by reference herein in their entireties.

FIELD OF THE DISCLOSURE

The present disclosure generally relates to systems and methods for ensuring a biological sample is properly preserved for analysis. More particularly, the present disclosure relates to systems and methods for ensuring that a cellular sample is sufficiently fixed to provide consistently good staining of tissue and/or cellular components.

BACKGROUND

Proper preservation of biological samples (such as surgical resections) is of great importance to their subsequent analysis. Currently, there are no standard procedures for fixing samples and this lack of standardization leads to a variety of quality issues in subsequent analyses. For example, following removal of a tissue sample from a subject, the sample is typically placed into a liquid that will suspend the metabolic activities of the cells and preserve its morphology. This process is commonly referred to as "fixation" and can be accomplished by several different types of liquids. However, the most common fixative used to preserve samples for subsequent preparation and analysis is 10% neutral buffered formalin (NBF).

"Fixation" in 10% NBF serves to preserve tissue by cross-linking of proteins and nucleic acids. The cross-linking preserves the characteristics of the tissue, such as the tissue structure, cell structure and molecular integrity. Typically, fixation with 10% NBF takes several hours and can be thought of as two separate steps. First is the diffusion step of formalin into the tissue. In the second step, formalin molecules interact with biological molecules in the tissue to form cross-links. These cross-links can help keep the cellular structure intact during subsequent processing steps such as tissue dehydration, clearing, embedding in paraffin, sectioning, de-paraffinization, and staining.

However, if the tissue is "over-fixed," it may be difficult to diffuse processing liquids through the tissue due to an overly extensive network of cross-linked molecules that limit paths for diffusion. This can result in inadequate penetration of subsequent processing liquids. If the processing liquid is a stain, slow diffusion rates can cause uneven and inconsistent staining. These types of problems can be increased if the "stain" includes relatively large molecules. For example, conjugated biomolecules (such as antibody or nucleic acid probe molecules) can be relatively large, often having a mass of several hundred kilodaltons, causing them to diffuse slowly into solid tissue, particularly if the tissue is over-fixed. While over-fixation can sometimes be remedied by extensive antigen and target retrieval procedures, such procedures are time consuming and not always successful, particularly for retrieval of labile biomarkers such as phosphorylated proteins.

If the tissue is under-fixed, the tissue may be degraded, for example, by autocatalytic destruction, leading to loss of tissue and cellular morphology as well as loss of protein and nucleic acid markers of diagnostic significance. Furthermore, processing after incomplete fixation of a sample can also lead to loss of morphological features of diagnostic significance. For example, without a sufficient network of cross-linked molecules, cells, nuclei and cytoplasm can shrink during dehydration steps. Accordingly, under-fixed tissue may be unsuitable for examination and is often discarded.

Conventional pathology practice is often based on predetermined fixation settings based on empirical knowledge of processing times for sample dimensions (e.g., thicknesses) and tissue type. It is often difficult to properly stain tissue without knowing this information; tissue is thus often tested to obtain such information. Unfortunately, the testing may be time-consuming, destroy significant portions of sample, and lead to reagent waste. By way of example, numerous iterations with different antigen retrieval settings for IHC/ISH stains may be performed in order to match and/or compensate for an unknown fixation state and an unknown tissue composition. The repeated staining runs result in additional sample material consumption and lengthy periods for diagnosis.

BRIEF SUMMARY OF THE DISCLOSURE

Disclosed are a system and method for determining the concentration of a reagent (such as formaldehyde) at a particular spatial point(s) at particular time(s) within a biological sample, rather than as an average across the entire sample cross-section. The system and method are based on acoustic time-of-flight (TOF) information correlated with a diffusion model to reconstruct the concentration of the reagent (such as formaldehyde) at a particular point(s) within a tissue sample over time as the reagent diffuses into the sample.

In one aspect of the present disclosure is a method is provided for determining a reagent concentration at a particular point(s) within a sample immersed within a reagent, at a given time, the method including simulating a spatial dependence of diffusion into the sample over a plurality of time points and for each of a plurality of candidate diffusivity constants to generate a model time-of-flight, and comparing the model time-of-flight with an experimental time-of-flight to obtain an error function, wherein a minimum of the error function yields the diffusivity constant for the sample. The method further includes providing a plurality of candidate tissue porosities and using each of these candidate tissue porosities to generate a model time-of-flight using the diffusivity constant and comparing the model time-of-flight with an experimental time-of-flight to obtain a second error function, wherein a minimum of the error function yields the porosity of the sample. From the determined diffusivity constant and the porosity of the sample, the concentration at a particular point or points within the sample at a particular time can be calculated.

The method has yielded the surprising result that once a formaldehyde concentration of above about 100 mM (such as above 90 mM) is reached in a tissue sample, quality detection ("staining") of molecular targets and faithful morphological integrity, as judged by pathologist scoring against industry "gold standards," is reliably achieved, yielding a better receiver operating characteristic (ROC) curve of relative true positives versus false positives than previous results for modeled diffusivity constants alone. Furthermore, the addition of spatial information regarding true reagent concentration and an understandable SI unit of measure makes it possible to utilize other techniques, such as radio-label tracing, mid-IR or magnetic resonance techniques to directly determine when this threshold formaldehyde concentration is reached within a particular type, size and shaped sample, either statically or dynamically (e.g. in real-time), in order to help ensure that quality staining will be obtained at any given point(s) in a tissue sample. In other words, using the disclosed method it is possible to arrive at a fixation level for a tissue sample (or portion thereof, such as at the center) that is sufficient to preserve morphology and biomarkers within the sample without unduly complicating further analysis through over-fixation.

In an alternative embodiment, once a concentration sufficient to preserve one biomarker for reliable detection is achieved in a particular spatial portion of the sample, other portions of the sample can be selected to have higher or lower concentrations of formalin that are better suited for detection of one or more additional biomarkers. In yet another alternative embodiment, based on a known formaldehyde concentration distribution reached during fixation of a particular sample type of a particular shape for a particular time, selected portions (such as selected tissue sections) of the sample can be utilized for different tests according to the optimal formaldehyde concentration for the particular test (such as a test for a labile marker such as FoxP3 or RNA). The fixation can be carried out either at room temperature or using a cold+hot protocol as described herein. More particularly, in a cold+hot protocol, the optimal formaldehyde concentration is reached during the cold step.

In another aspect of the present disclosure is a system including an acoustic monitoring device that detects acoustic waves that have traveled through a tissue sample, and a computing device communicatively coupled to the acoustic monitoring device, the computing device is configured to evaluate a speed of the acoustic waves based on a time-of-flight and including instructions, when executed, for causing the processing system to perform operations comprising setting a range of candidate diffusivity constants for the tissue sample, simulating a spatial dependence of a reagent within the tissue sample for a plurality of time points and for a first of the range of candidate diffusivity points, determining a modeled time-of-flight based on the spatial dependence, repeating the spatial dependence simulation for each of the plurality of diffusivity constants, and determining an error between the modeled-time-of-flight for the plurality of diffusivity constants versus an experimental time-of-flight for the tissue sample, wherein a minimum of an error function based on the error yields a diffusivity constant for the tissue sample. The system further includes instructions, when executed, for causing the processing system to perform operations comprising setting a range of candidate porosities for the tissue sample that includes a plurality of candidate porosities (such as between about 0.05 and about 0.50, for example between about 0.05 and about 0.40 or between about 0.05 and about 0.30), determining a second modeled time-of-flight based on the diffusivity constant of the sample and a first of the plurality of candidate porosities, and determining a second error between the experimental time-of-flight and the second modeled time-of-flight, repeating the determination of the second modeled time-of-flight for others of the plurality of candidate porosities and a corresponding second error, wherein a minimum of the error identifies the porosity of the sample. In more particular embodiments, the system further includes instructions, that when executed, yield a spatial concentration distribution of the reagent within the sample at a particular time. In an even more particular embodiment, the system further includes instructions, that when executed provide a reagent concentration at the center of the sample at a particular time. In still an even more particular embodiment, such a reagent concentration can be utilized to terminate infusion of the sample with the reagent when a pre-determined concentration is reached at a particular point or region within the sample, such as at the center of the sample.

In yet another aspect of the present disclosure is a tangible non-transitory computer-readable medium is provided to store computer-readable code that is executed by a processor to perform operations including comparing a simulated time-of-flight for a sample material with an experimental time-of-flight for the sample material, obtaining a diffusivity constant for the sample material based on a minimum of an error function between the simulated time-of-flight and the acoustic time-of-flight, comparing a second simulated time-of-flight for a sample material obtained using the diffusivity constant and the experimental decay constant (tau) to the experimental time-of-flight, obtaining a porosity for the sample material based on a minimum of a second error function, and optionally calculating a spatial distribution of the concentration of the reagent or a concentration of the reagent at a particular point or region of the sample.

DETAILED DESCRIPTION

Figure 1:
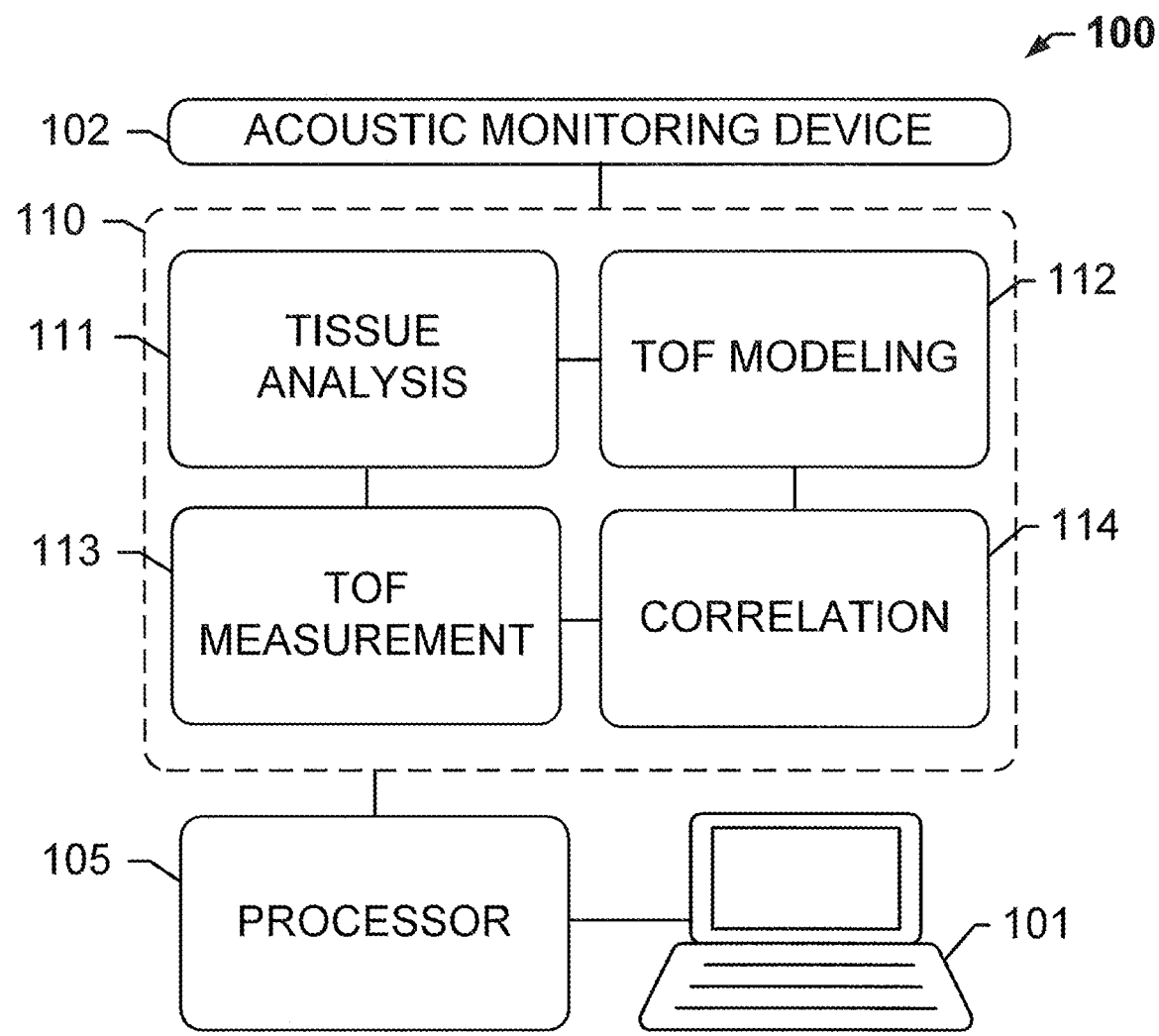
FIG. 1 shows a tissue processing system 100 for optimized tissue fixation, according to an exemplary embodiment of the subject disclosure.

It should also be understood that, unless clearly indicated to the contrary, in any methods claimed herein that include more than one step or act, the order of the steps or acts of the method is not necessarily limited to the order in which the steps or acts of the method are recited.

As used herein, the singular terms "a," "an," and "the" include plural referents unless context clearly indicates otherwise. Similarly, the word "or" is intended to include "and" unless the context clearly indicates otherwise. The term "includes" is defined inclusively, such that "includes A or B" means including A, B, or A and B.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of" or "exactly one of." "Consisting essentially of," when used in the claims, shall have its ordinary meaning as used in the field of patent law.

The terms "comprising," "including," "having," and the like are used interchangeably and have the same meaning. Similarly, "comprises," "includes," "has," and the like are used interchangeably and have the same meaning. Specifically, each of the terms is defined consistent with the common United States patent law definition of "comprising" and is therefore interpreted to be an open term meaning "at least the following," and is also interpreted not to exclude additional features, limitations, aspects, etc. Thus, for example, "a device having components a, b, and c" means that the device includes at least components a, b and c. Similarly, the phrase: "a method involving steps a, b, and c" means that the method includes at least steps a, b, and c. Moreover, while the steps and processes may be outlined herein in a particular order, the skilled artisan will recognize that the ordering steps and processes may vary.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

I. Technical Implementation

The present disclosure provides systems and computer-implemented methods for calculating the diffusivity constant (also known as "diffusion coefficient") and/or a porosity of a sample (e.g. through the use of acoustic time-of-flight (TOF) based information correlated with a diffusion model to reconstruct a spatiotemporal concentration profile across a tissue sample).

In some embodiments, tissue preparation systems and methods disclosed herein may be adapted to monitor the diffusion of fixative fluid into a tissue sample until a predetermined concentration level is reached. For example, as formalin penetrates into tissue, it displaces interstitial fluid. This fluid exchange at least partially changes the composition of the tissue volume, and this change may be monitored. By way of example, given that interstitial fluid and formalin each react differently to an introduced ultrasound pulse (i.e. each fluid has a discrete "sound velocity" property), an output ultrasound pulse will accumulate a small transit time differential that increases as more fluid exchange occurs, i.e. as more formalin displaces interstitial fluid. This enables operations such as determining the phase differential accumulated by diffusion based on the geometry of the tissue sample, modeling the impact of the diffusion on the TOF, and/or using a post-processing algorithm to correlate the results to determine the diffusivity constant. Moreover, the sensitivity of the disclosed TOF instruments can detect a change of less than 10 parts per million enabling potentially more accurate characterization of the diffusivity constant and porosity. On the nanosecond TOF scale, all fluids and tissues will have discrete sound velocities, so the disclosed operations are not limited to solely quantifying water diffusion but may be used to monitor the diffusion of all fluids into all tissues. For example, diffusion of dehydrating reagents (such as graded ethanols), clearing agents (such as xylene) and paraffin used for embedding of a tissue sample.

The rate of diffusion may be monitored by a system of acoustic probes based on the different acoustic properties of formalin-soaked tissue samples. Such a system for diffusion monitoring and experimental TOF measurement is described in further detail U.S. Patent Publication Nos. 2013/0224791, 2017/0284969, 2017/0336363, 2017/0284920, and 2017/0284859 the disclosures of which are each incorporated by reference herein in their entireties. Another suitable system for diffusion monitoring and experimental TOF measurement is also described in the international patent application entitled ACCURATELY CALCULATING ACOUSTIC TIME-OF-FLIGHT filed in Dec. 17, 2015, the contents of each of which are hereby incorporated by reference herein in their entirety.

Further examples of suitable systems and methods for TOF monitoring are described in PCT Publication No. WO2016/097163 and US Patent Publication No. 2017/0284859, the contents of which are also incorporated by reference herein to the extent they are not inconsistent with the present disclosure. The referenced applications describe solid tissue samples being contacted with a liquid fixative that travels through the tissue samples and diffuses throughout substantially the entire thickness of the tissue samples and being analyzed based on acoustic characteristics that are continuously or periodically monitored to evaluate the state and condition of the tissue sample throughout processing. For example, a fixative such as formalin having a bulk modulus greater than interstitial fluid can significantly alter the TOF as it displaces the interstitial fluid. Based on the obtained information, a fixation protocol may be adjusted to enhance processing consistency, reduce processing times, improve processing quality, or the like. The acoustic measurements may be used to non-invasively analyze tissue samples. The acoustic properties of tissue samples may change as liquid reagent (e.g., a liquid fixative) travels through the sample. The sample's acoustic properties can change during, for example, a pre-soak process (e.g., diffusion of cold fixative), a fixation process, a staining process, or the like. In the fixation process (e.g., a cross-linking process), the speed of transmission of acoustic energy can change as the tissue sample becomes more heavily cross-linked. Real-time monitoring can be used to accurately track movement of the fixative through the sample. For example, a diffusion or fixation status of a biological sample can be monitored based on a time-of-flight (TOF) of acoustic waves. Other examples of measurements include acoustic signal amplitude, attenuation, scatter, absorption, phase shifts of acoustic waves, or combinations thereof.

In some embodiments, the movement of the fixative through the tissue sample may be monitored in real-time.

II. Systems and Methods

A "time-of-flight" or "TOF" as used herein is, for example, the time that it takes for an object, particle or acoustic, electromagnetic or other wave to travel a distance through a medium. The TOF may be measured empirically e.g. by determining a phase differential between the phases of an acoustic signal emitted by a transmitter ("transmitted signal") and an acoustic signal received by a receiver ("received signal") that has passed through an object immersed in a fluid and an acoustic signal that has passed through the fluid alone.

As used herein, the term "biological sample," "biological specimen," "tissue sample," "sample," or the like refers to any sample including a biomolecule (such as a protein, a peptide, a nucleic acid, a lipid, a carbohydrate, or a combination thereof) that is obtained from any organism including viruses. Other examples of organisms include mammals (such as humans; veterinary animals like cats, dogs, horses, cattle, and swine; and laboratory animals like mice, rats and primates), insects, annelids, arachnids, marsupials, reptiles, amphibians, bacteria, and fungi. Biological samples include tissue samples (such as tissue sections and needle biopsies of tissue), cell samples (such as cytological smears such as Pap smears or blood smears or samples of cells obtained by microdissection), or cell fractions, fragments or organelles (such as obtained by lysing cells and separating their components by centrifugation or otherwise). Other examples of biological samples include blood, serum, urine, semen, fecal matter, cerebrospinal fluid, interstitial fluid, mucous, tears, sweat, pus, biopsied tissue (for example, obtained by a surgical biopsy or a needle biopsy), nipple aspirates, cerumen, milk, vaginal fluid, saliva, swabs (such as buccal swabs), or any material containing biomolecules that is derived from a first biological sample. In certain embodiments, the term "biological sample" as used herein refers to a sample (such as a homogenized or liquefied sample)

prepared from a tumor or a portion thereof obtained from a subject. The samples may be contained e.g. on a tissue sample slide.

The "Porosity" is a measure of the void (i.e. "empty") spaces in a material and is a fraction of the volume of voids over the total volume of an object, between 0 and 1, or as a percentage between 0 and 100%. A "porous material" as used herein refers to, for example, a 3D object having a porosity larger than 0.

A "diffusion coefficient" or "diffusivity constant" as used herein is, for example, a proportionality constant between the molar flux due to molecular diffusion and the gradient in the concentration of the object whose diffusion is observed (or the driving force for diffusion). Diffusivity is encountered e.g. in Fick's law and numerous other equations of physical chemistry. The higher the diffusivity (of one substance with respect to another), the faster they diffuse into each other. Typically, a compound's diffusivity constant is −10,000× as great in air as in water. Carbon dioxide in air has a diffusivity constant of 16 mm2/s, and in water its diffusivity constant is 0.0016 mm2/s.

A "phase differential" as used herein is, for example, the difference, expressed in degrees or time, between two waves having the same frequency and referenced to the same point in time.

A "biopsy capsule" as used herein is, for example, a container for a biopsy tissue sample. Typically, a biopsy capsule comprises a mesh for holding the sample and letting a liquid reagent, e.g. a buffer, a fixation solution or a staining solution surround and diffuse into a tissue sample. A biopsy capsule can maintain the sample in a particular shape, which shape can advantageously provide the sample with a shape that is computationally easier to model according to the disclosed method and thus be more suitable for use in a disclosed system. A "cassette" as used herein refers to, for example, a container for a biopsy capsule or a tissue sample not contained within a biopsy capsule. Preferentially, the cassette is designed and shaped such that it can automatically be selected and moved, e.g. raised and lowered, relative to the beam path of an ultrasonic transmitter-receiver pair, and further has openings that permit movement of a liquid reagent into and out of the cassette and thus further into and out of a tissue sample held within. The movement may be performed for example by a robotic arm or another automated movable component of a device onto which the cassette is loaded. In other embodiments, a cassette alone is use for containing a tissue sample and the shape of the cassette can, at least in part, determine the shape of the tissue sample. For example, placing a rectangular tissue block that is slightly thicker that the depth of a cassette into a cassette and closing the cassette lid can cause the tissue sample to be compressed and spread to fill a greater portion of the inner space of the cassette, and thus be transformed into a thinner piece having a greater height and width, but having a thickness corresponding roughly to the depth of the cassette.

In some embodiments, a system of calculating a formaldehyde concentration or other reagent is provided, the system including a signal analyzer having a processor and a memory coupled to the processor, the memory to store computer-executable instructions that, when executed by the processor, cause the processor to perform operations including calculation of a formalin concentration from a set of acoustic data as discussed in further detail below.

In some embodiments, a data input into the signal analyzer is an acoustic data set generated by an acoustic monitoring system, where the acoustic data set is generated by transmitting an acoustic signal so that the acoustic signal encounters a material of interest, and then detecting the acoustic signal after the acoustic signal has encountered the material of interest. In some embodiments, a system is provided comprising a signal analyzer as disclosed herein and an acoustic monitoring system discussed in further detail below. Additionally, or alternatively, a system may be provided comprising a signal analyzer as disclosed herein and a non-transitory computer readable medium comprising an acoustic data set obtained from an acoustic monitoring system as disclosed herein. In an embodiment, the acoustic data is generated by frequency sweep transmitted and received by the acoustic monitoring system. As used herein, the term "frequency sweep" shall refer to a series of acoustic waves transmitted at fixed intervals of frequencies through a medium, such that a first set of acoustic waves is emitted through the medium at a fixed frequency for a first fixed duration of time, and subsequent sets of acoustic waves are emitted at fixed frequency intervals for subsequent—preferably equal—durations.

In some embodiments, the system is adapted for monitoring diffusion of a fluid into a porous material. In such an embodiment, a system may be provided comprising: (a) a signal analyzer; (b) an acoustic monitoring system as discussed herein and/or a non-transitory computer readable medium comprising an acoustic data set generated by said acoustic monitoring system; and (c) an apparatus for holding a porous material immersed in a volume of a fluid. In some embodiments, the system is adapted to monitor diffusion of a fixative into a tissue sample.

In some embodiments, the formalin concentration or other reagent concentration is determined for the purpose of characterizing the extent to which a reagent has penetrated a porous object. For example, the method may be used for monitoring a staining process of an object, e.g. cloth, plastics, ceramics, tissues or others, for monitoring a fixation process or other tissue processing step, such as dehydration, clearing and paraffin embedding.

In some embodiments, the present disclosure provides an acoustic monitoring system for collecting an acoustic data set, the acoustic monitoring system comprising a transmitter and a receiver, wherein the transmitter and receiver are arranged such that acoustic signals generated by the transmitter are received by the receiver and transformed into a computer-readable signal. In some embodiments, the system comprises an ultrasonic transmitter and an ultrasonic receiver. As used herein, a "transmitter" refers to a device capable of converting an electrical signal to acoustic energy. As used herein, an "ultrasonic transmitter" refers a device capable of converting an electrical signal to ultrasonic acoustic energy. As used herein, a "receiver" is a device capable of converting an acoustic wave to an electrical signal; and an "ultrasonic receiver" is a device capable of converting ultrasonic acoustic energy to an electrical signal."

In some embodiments, certain materials useful for generating acoustic energy from electrical signals are also useful for generating electrical signals from acoustic energy. In some embodiments, the transmitter and receiver do not necessarily need to be separate components, although they can be. In some embodiments, the transmitter and receiver are arranged such that the receiver detects acoustic waves generated by the transmitter after the transmitted waves have encountered a material of interest. In some embodiments, the receiver is arranged to detect acoustic waves that have been reflected by the material of interest. In other embodiments, the receiver is arranged to detect acoustic waves that have been transmitted through the material of interest.

In some embodiments, the transmitter comprises at least a waveform generator operably linked to a transducer, the waveform generator being configured to generate an electrical signal that is communicated to the transducer, the transducer being configured for converting the electrical signal to an acoustic signal. In some embodiments, the waveform generator is programmable, such that a user may modify certain parameters of the frequency sweep, including for example: starting and/or ending frequency, the step size between frequencies of the frequency sweep, the number of frequency steps, and/or the duration for which each frequency is transmitted. In other embodiments, the waveform generator is pre-programmed to generate one or more a pre-determined frequency sweep pattern. In other embodiments, the waveform generator may be configured to transmit both pre-programmed frequency sweeps and customized frequency sweeps. The transmitter may also contain a focusing element, which allows the acoustic energy generated by the transducer to be predictably focused and directed to a specific area of an object.

In some embodiments, the transmitter can transmit a frequency sweep through the medium, which is then detected by the receiver and transformed into the acoustic data set to be stored in a non-transitory computer readable storage medium and/or transmitted to the signal analyzer for analysis. In some embodiments, where the acoustic data set includes data representative of a phase difference between the transmitted acoustic waves and the received acoustic waves, the acoustic monitoring system may also include a phase comparator. In some embodiments, the phase comparator generates an electrical signal that corresponds to the phase difference between transmitted and received acoustic waves. In some embodiments, the acoustic monitoring system comprises a phase comparator communicatively linked to a transmitter and/or a receiver. In some embodiments, where the output of the phase comparator is an analog signal, the acoustic monitoring system may also include an analog to digital converter for converting the analog output of the phase comparator to a digital signal. In some embodiments, the digital signal may then be recorded, for example, on a non-transitory computer readable medium, or may be communicated directly to the signal analyzer for analysis. Alternatively, and in some embodiments, the transmitter can transmit acoustic energy at a particular frequency and the signal detected by the receiver is stored and analyzed for its peak intensity.

In some embodiments, a signal analyzer is provided containing a processor and a memory coupled to the processor, the memory to store computer-executable instructions that, when executed by the processor, cause the processor to calculate a formalin concentration based at least in part on an acoustic data set generated by an acoustic monitoring system as discussed above.

The term "processor" encompasses all kinds of apparatus, devices, and machines for processing data, including by way of example a programmable microprocessor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus also can include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., an LCD (liquid crystal display), LED (light emitting diode) display, or OLED (organic light emitting diode) display, for displaying information to the user and a keyboard and a pointing device, e.g., a mouse or a trackball, by which the user can provide input to the computer. In some implementations, a touch screen can be used to display information and receive input from a user. Other kinds of devices can be used to provide for interaction with a user as well; for example, feedback provided to the user can be in any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include any number of clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

In some embodiments, the signal analyzer accepts as an input an acoustic data set recorded from a test material. The acoustic data set is representative of at least a portion of a frequency sweep that is detected after the frequency sweep encounters a material of interest. In some embodiments, the portion of the frequency sweep that is detected constitutes acoustic waves that are reflected by the material of interest. In other embodiments, the portion of the frequency sweep that is detected constitutes acoustic waves that have passed through the material of interest. Alternatively, the acoustic data set is representative of burst of acoustic energy of a single frequency that is reflected or has passed through the material of interest.

FIG. 1 shows an embodiment of a system useful for tissue processing 100 (e.g., for optimized tissue fixation, dehydration, clearing or embedding), according to an exemplary embodiment of the subject disclosure. System 100 comprises an acoustic monitoring device 102 communicatively coupled to a memory 110 for storing a plurality of processing modules or logical instructions that are executed by processor 105 coupled to computer 101. Acoustic monitoring device 102 may comprise the aforementioned acoustic probes including one or more transmitters and one or more receivers. The tissue sample may be immersed in a liquid fixative while the transmitters and receivers communicate to detect time-of-flight (TOF) of acoustic waves.

In some embodiments, the system 100 employs one or more processors 105 and at least one memory 110, the at least one memory 110 storing non-transitory computer-readable instructions for execution by the one or more processors to cause the one or more processors to execute instructions (or stored data) in one or more modules, including: a tissue analysis module 111 for receiving information about the tissue block via user input or electronic input and for determining tissue characteristics such as an acoustic velocity of the tissue; a TOF modeling module 112 for simulating a spatial dependence of relative fixative or reagent concentrations for various times and model diffusion constants to generate a time-varying ("expected" or "modeled") TOF signal and outputting a model decay constant; a TOF measurement module 113 for determining an actual TOF signal of the tissue, computing a spatial average, and generating an experimental decay constant that depends on tissue characteristics (e.g. actual cell types, cell densities, cell sizes and effects of sample preparation and/or sample staining) and input from acoustic monitoring device 102; and a correlation module 114 for correlating (e.g. comparing) the experimental and modeled TOF data, determining a diffusivity constant for the tissue sample based on a minimum of an error function of the correlation, using the determined diffusivity constant in the modelling module 112 along with candidate porosity values for the tissue sample to generate second model TOF signals, and again using the correlation module 114 to make a second correlation between the second model TOF signals based on the determined diffusivity constant and candidate porosities for the sample and the experimental TOF data, determining a porosity of the tissue sample based on a minimum of an error function of the second correlation between the experimental TOF data and the model TOF signals generated using the determined diffusivity constant, and calculating based on the experimental TOF signal, the determined diffusivity constant and the determined porosity, a concentration of a reagent within the sample at a particular point in space and time.

These and other operations performed by these modules may result in an output of quantitative or graphical results to a user operations computer 101. Consequently, although not shown in FIG. 1, computer 101 may also include user input and output devices such as a keyboard, mouse, stylus, and a display/touchscreen.

As described above, the modules include logic that is executed by processor 105. "Logic", as used herein and throughout this disclosure, refers to any information having the form of instruction signals and/or data that may be applied to affect the operation of a processor. Software is one example of such logic. Examples of processors are computer processors (processing units), microprocessors, digital signal processors, controllers and microcontrollers, etc. Logic may be formed from signals stored on a computer-readable medium such as memory 110 that, in an exemplary embodiment, may be a random access memory (RAM), read-only memories (ROM), erasable/electrically erasable programmable read-only memories (EPROMS/EEPROMS), flash memories, etc. Logic may also comprise digital and/or analog hardware circuits, for example, hardware circuits comprising logical AND, OR, XOR, NAND, NOR, and other logical operations. Logic may be formed from combinations of software and hardware. On a network, logic may be programmed on a server, or a complex of servers. A particular logic unit is not limited to a single logical location on the network. Moreover, the modules need not be executed in any specific order. Each module may call another module when needed to be executed.

In some embodiments, the acoustic monitoring device 102 may be retrofitted onto a commercial dip-and-dunk tissue processor such as the Lynx II by Electron Microscopy Sciences (RTM). In some embodiments, a mechanical head designed using Solidworks® software may be fit around and seal a standard reagent canister. Once sealed, an external vacuum system may initiate to degas the bulk reagent as well as the contents of the cassette, including the tissue. In some embodiments, a cassette holder designed for use with either a standard sized histological cassette such as CellSafe 5 by CellPath (RTM) or a biopsy capsule such as CellSafe Biopsy Capsules by CellPath (RTM) for smaller tissue samples may be utilized. Each holder would securely hold the tissue to prevent the sample from slipping during the experiment. The cassette holder may be attached to a vertical translation arm that would slide the cassette holder in one direction. In some embodiments, the mechanical head may be designed with two metal brackets on either side of the tissue cassette, with one bracket housing 5 transmitting transducers, and the other bracket housing 5 receiving transducers that are spatially aligned with their respective transmitting transducers. In some embodiments, the receiving bracket may also house a pair of transducers oriented orthogonal to the propagation axis of the other transducers. After each acquisition, the orthogonal sensors may calculate a reference TOF value to detect spatiotemporal variations in the fluid that has a profound effect on sound velocity. Additionally, at the end of each 2D acquisition, the cassette may be raised up and a second reference acquisition acquired. In some embodiments, these reference TOF values may be used to compensate for environmentally-induced fluctuations in the formalin. Environmentally-induced fluctuations in the formalin or any other fixative may be, for example, temperature fluctuations in the container comprising the porous material, vibrations, and others.

Figures 2A, 2B:
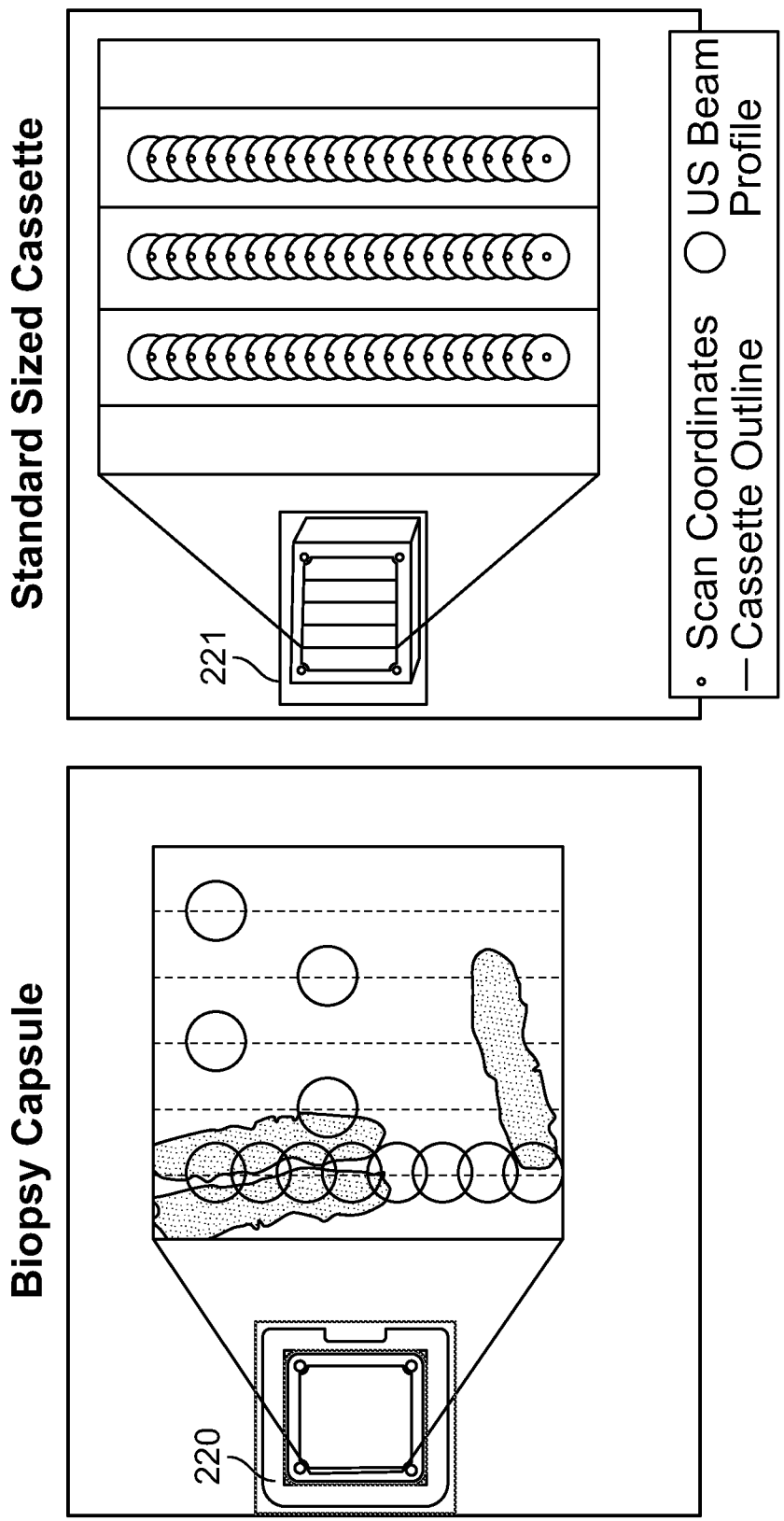
FIGS. 2A and 2B respectively show depictions of ultrasound scan patterns from a biopsy capsule and from a standard-sized cassette.

FIGS. 2A and 2B, respectively, depict examples of ultrasound scan patterns from a biopsy capsule and from a standard-sized cassette. The measurement and modeling procedures described herein for a tissue samples may likewise be applied on other forms of porous material. As such, while the present disclosure may illustrate modeling in the context of a tissue sample, such examples are non-limiting and the techniques may be applied to other materials, such as any porous material.

As described herein, the measurements from the acoustic sensors in an acoustic monitoring device may be used to track the change and/or rate of change of a TOF of acoustic signals through the tissue sample. This includes monitoring the tissue sample at different positions (e.g. a plurality of different positions, such as at least 2 different positions, such as at least 3 different positions, such as at least 4 different positions, such as at least 8 different positions) over time to determine diffusion over time or a rate of diffusion.

For example, the "different positions," also referred to "candidate diffusivity positions" may be a position within or on the surface of the tissue sample. According to some embodiments, the sample may be positioned at different "sample positions" by a relative movement of biopsy capsule and acoustic beam path. The relative movement may comprise moving the receiver and/or the transducer for "scanning" over the sample in a stepwise or continuous manner. Alternatively, the cassette may be repositioned by means of a movable cassette holder.

For example, to image all the tissue in the cassette, the cassette holder may be sequentially raised ≈1 mm vertically and TOF values acquired at each new position, as depicted in FIGS. 2A and 2B. The process may be repeated to cover the entire open aperture of the cassette. Referring to FIG. 2A, when imaging tissue in the biopsy capsule 220, signals are calculated from all 5 transducers pairs, resulting in the scan pattern depicted in FIG. 2A. Alternatively, when imaging tissue in the standard sized cassette 221 depicted in FIG. 2B, the 2nd and 4th transducer pairs may be turned off and TOF values acquired between the 1st, 3rd, and 5th transducer pairs located at the respective centers of the three middle subdivisions of the standard sized cassette 221. In some embodiments, two tissue cores may then be placed in each column, one on the top and one on the bottom, enabling TOF traces from 6 samples (2 rows X 3 columns) to simultaneously be obtained and significantly decreased run to run variation and increased throughput. In this exemplary embodiment, the full-width-half-maximum of the ultrasound beam is 2.2 mm.

In some embodiments, acoustic sensors in the acoustic monitoring device may include pairs of 4 MHz focused transducers such as the TA0040104-10 by CNIRHurricane Tech (Shenzhen) Co., Ltd. (RTM) that are spatially aligned, with a tissue sample being placed at their common foci. One transducer, designated the transmitter, may send out an acoustic pulse that traverses the coupling fluid (i.e. formalin) and tissue and is detected by the receiving transducer.

Figure 2C:
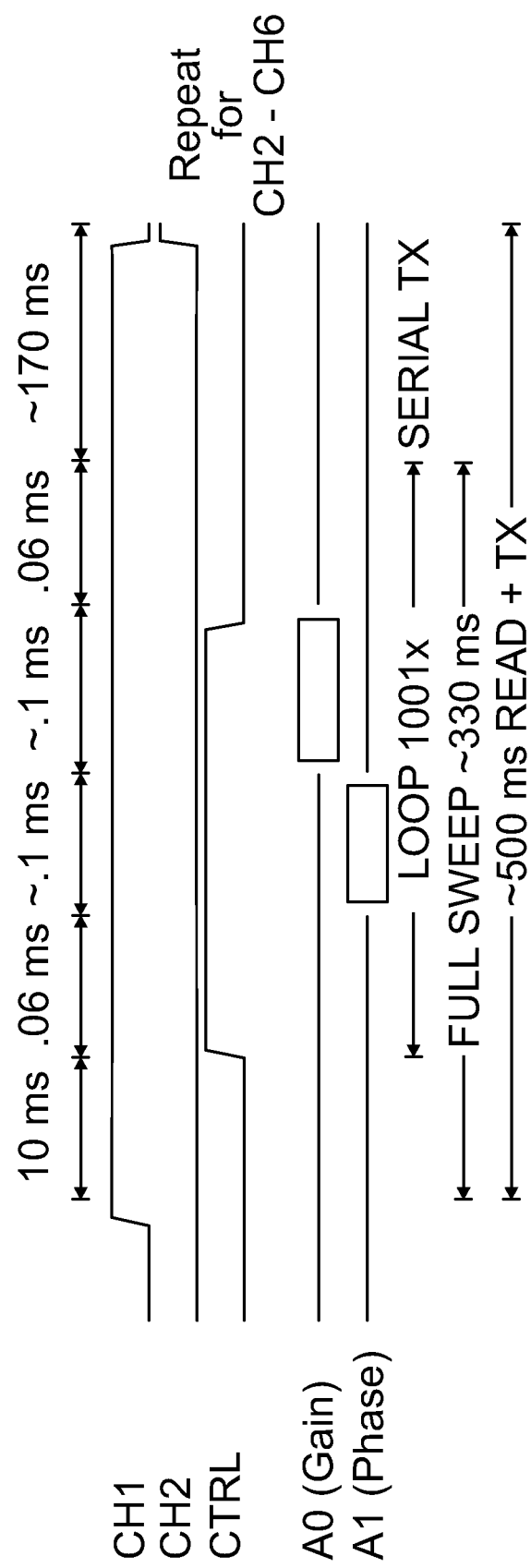
FIG. 2C shows a timing diagram for an exemplary embodiment of the subject disclosure.

FIG. 2C shows a timing diagram for an exemplary embodiment of the subject disclosure. Initially, the transmitting transducer can be programmed with a waveform generator such as the AD5930 by Analog Devices (RTM) to transmit a sinusoidal wave for several hundred microseconds. That pulse train may then be detected by the receiving transducer after traversing the fluid and tissue. The received ultrasound sinusoid and the transmitted sinusoid may be compared using, for instance, a digital phase comparator such as the AD8302 by Analog Devices. In some embodiments, the output of the phase comparator yields a valid reading during the region of temporal overlap between the transmitted and received pulses. The output of the phase comparator is allowed to stabilize before the output is queried with an integrated analog to digital converter on the microcontroller, such as the ATmega2560 by Atmel (RTM). The process may then be repeated at multiple acoustic frequencies across the bandwidth of the transducer to build up the phase relationship between the input and output sinusoids across a frequency range. This acoustic phase-frequency sweep is directly used to calculate the TOF using a post-processing algorithm analogous to acoustic interferometry and capable of detecting transit times with sub-nanosecond accuracy.

In some embodiments, the "measured TOF", i.e. the "measured TOF value" obtained for a particular time point and a particular candidate diffusivity point is computed from a measured phase shift between a transmitted ultrasound signal and the corresponding received ultrasound signal, whereby the beam path of the ultrasound signal crossed the particular candidate diffusivity point and whereby the phase shift was measured at the particular time point.

Figure 3:
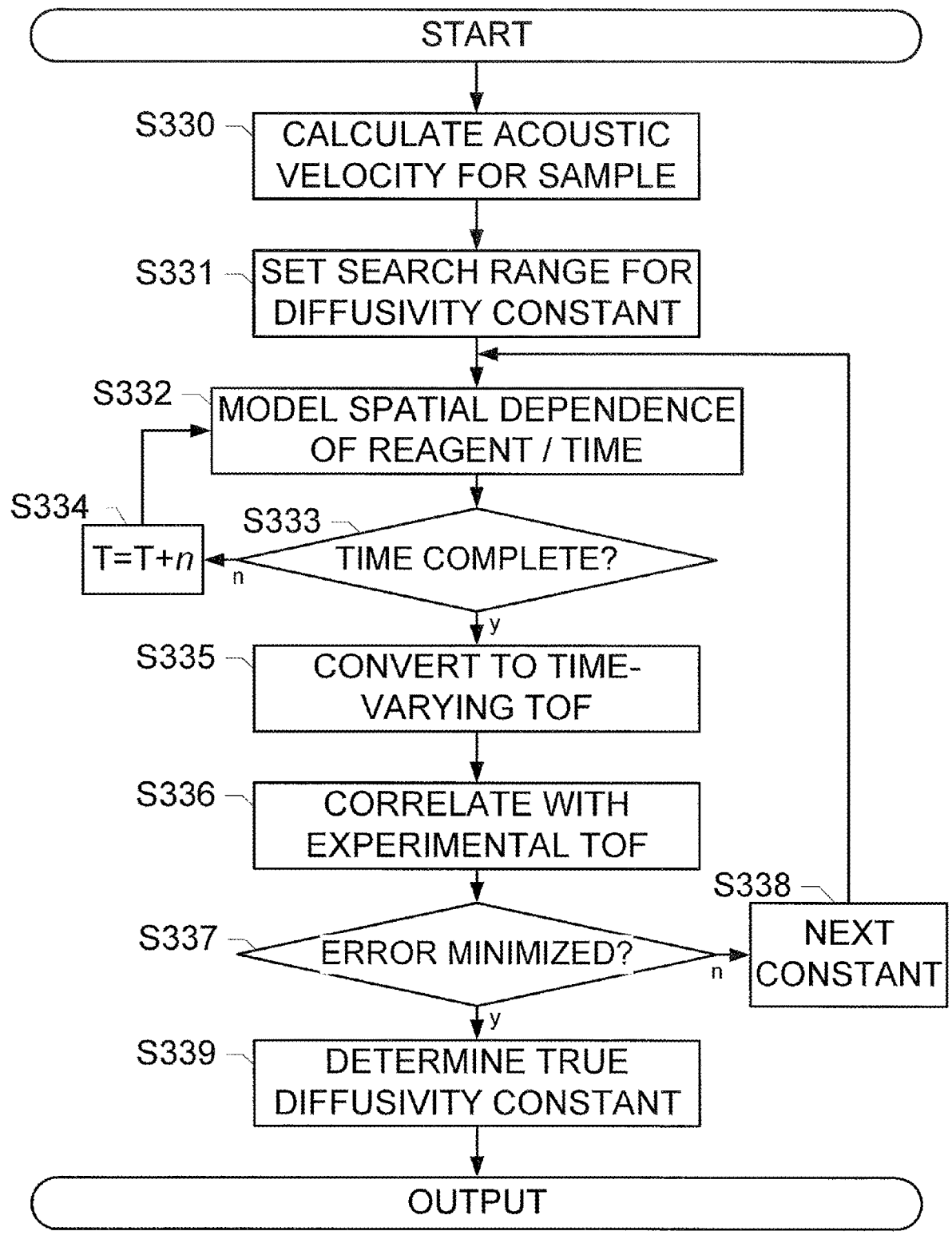
FIG. 3 shows a method for obtaining a diffusivity coefficient for a tissue sample.

FIG. 3 shows a method for obtaining a diffusivity coefficient for a tissue sample, according to an exemplary embodiment of the subject disclosure. The operations disclosed with respect to this embodiment may be performed by any electronic or computer-based system, including the system of FIG. 1. In some embodiments, the operations may be encoded on a computer-readable medium such as a memory and executed by a processor, resulting in an output that may be presented to a human operator or used in subsequent operations. Moreover, the operations may be performed in any order besides the order disclosed herein, provided the spirit of the subject disclosure is maintained.

In some embodiments, the method includes calculating an acoustic velocity for the tissue sample (S330). This operation includes calculating a speed of sound in the reagent that the tissue sample is immersed in. For example, a distance between ultrasound transducers $d_{sensor}$ i.e., the distance between the transmitting transducer and the receiving transducer, may be accurately measured, and a transit time $\tau_{reagent}$ between the ultrasound transmitter and the ultrasound receiver in pure reagent is measured, with the speed of sound in the reagent $r_{reagent}$ being calculated using:

$$r_{reagent} = \frac{d_{sensor}}{t_{reagent}}$$

In some embodiments, the tissue thickness may also be obtained via measurement or user input. A variety of suitable techniques are available to obtain tissue thickness, including ultrasound, mechanical, and optical methods. Finally, the acoustic velocity is determined (S330) by obtaining the phase retardation from the undiffused tissue (i.e., a tissue sample to which the fixation solution has not been applied yet) with respect to the bulk reagent (e.g. the fixation solution) using:

$$\Delta t = t_{tissue-reagent} - t_{reagent} \text{ and}$$

$$\frac{1}{r_{tissue}(t=0)} = \frac{1}{r_{reagent}} + \frac{\Delta t}{d_{tissue}}$$

In some embodiments, the specific equation is derived based on the known geometry of the tissue sample and, generally, this equation represents the speed of sound in the undiffused tissue sample (i.e. a tissue sample lacking the reagent, e.g. lacking the fixation solution) at a time t=0. In the experimental embodiment, for example, the acoustic velocity of a tissue sample may be calculated by first calculating the speed of sound in the reagent based on the distance between the two ultrasound transducers (that are herein also referred to as "sensors") ($d_{sensor}$) being accurately measured as with a calibrated caliper. In this example, the sensor separation was measured with a caliper and sensor separation $d_{sensor}$=22.4 mm. Next the transit time ($\tau_{reagent}$) required for an acoustic pulse to traverse the reagent (lacking the tissue) between the sensors may be accurately recorded with an applicable program. In the experimental example, $\tau_{reagent}$=16.71 µs for a bulk reagent of 10% NBF (neutral buffered formalin). The sound velocity in the reagent ($r_{reagent}$) may then be calculated as:

$$r_{reagent} = \frac{d_{sensor}}{t_{reagent}} = \frac{22.4 \text{ mm}}{16.71 \text{ µs}} \approx 1.34 \text{ mm/µs}$$

In this experiment, a sample piece of tonsil was cored with a 6 mm histological biopsy core punch to ensure accurate and standardized sample thickness ($dt_{tissue}$=6 mm), and the TOF differential (Δt) was calculated between the acoustic sensors with the tissue present ($\tau_{tissue+reagent}$) and without the tissue present ($\tau_{reagent}$):

$$\Delta t = \tau_{tissue+reagent} \tau_{reagent}$$

$$\Delta t = 16921.3 - 16709.7 = 211.6 ns$$

The time $\tau_{reagent}$ is the time required by an ultrasound signal for traversing the distance from the transmitting transducer to the receiving transducer, whereby the signal passes a reagent volume but not the tissue sample. Said traversal time can be measured e.g. by placing a biopsy capsule between the two sensors that has the same diameter as the tissue, e.g. 6 mm, and performing a TOF measurement for a signal that passes solely the reagent, not the tissue.

The time $\tau_{tissue}$ is the time required by an ultrasound signal for traversing the distance from the transmitting transducer to the receiving transducer, whereby the signal passes the tissue sample that does not comprise and is not surrounded by the reagent. Said traversal time can be measured e.g. by placing a biopsy capsule between the two sensors before adding the reagent to the capsule and performing a TOF measurement for a signal that passes solely the tissue.

The time differential (or "TOF differential") Δt caused by the tissue in addition to the tissue's thickness and the speed of sound in the reagent may be used to calculate the sound velocity of the undiffused tissue ($\tau_{tissue}(t=0)$) with the following equation derived from the known geometry (e.g. cylinder-shape, cube-shaped, box-shaped, etc.) of the sample:

$$\frac{1}{r_{tissue}(t=0)} = \frac{1}{1.34 \text{ mm/µs}} + \frac{0.2116 \text{ µs}}{6 \text{ mm}} \Rightarrow r_{tissue}(t=0) = 1.28 \text{ mm/µs}$$

Subsequently, a modeling process is executed to model the TOF over a variety of candidate diffusivity constants. The candidate diffusivity constants comprise a range of constants selected (S331) from known or prior knowledge of tissue properties obtained from the literature. The candidate diffusivity constants are not precise but are simply based on a rough estimate of what the range may be for the particular tissue or material under observation. These estimated candidate diffusivity constants are provided to the modeling process (steps S332-S335), with a minimal of an error function being determined (S337) to obtain the true diffusivity constant of the tissue. In other words, method tracks differences between the experimentally measured TOF diffusion curve and a series of modeled diffusion curves with varying diffusivity constants.

For example, upon selecting one of a plurality of candidate diffusivity constants, the spatial dependence of the reagent concentration in the tissue sample is simulated (S332), based on a calculation of the reagent concentration $C_{reagent}$ as a function of time and space, using the solution to a heat equation for a cylindrical object:

$$C_{reagent}(t, D, x) = c_{max}\left(1 - 2\sum_{n=1}^{\infty} \frac{e^{-D\alpha_n^2 t/R_0^2} J_0(\alpha_n x/R_o)}{\alpha_n J_1(\alpha_n)}\right)$$

where x is the spatial coordinate in the depth direction of the tissue, Ro is the radius of the sample, D is the candidate diffusivity constant, t is time, Jo is a Bessel function of the first kind and 0th order, J1 is a Bessel function of the first kind and 1st order, αn is the location of the nth root of a 0th order Bessel function, and $c_{max}$ is the maximum concentration of the reagent. In other words, the summation of the coefficient of each of these Bessel functions (higher-order differential equations), provides the constant as a function of space, time, and rate, i.e. the diffusivity constant. Although this equation is specific to the cylindrical tissue sample disclosed in these experimental embodiments, and the equation would change depending on the shape or boundary condition, the solution to the heat equation for any shape may provide the diffusivity constants for that shape. For example, heat equations for object having spherical, cubic or rectangular block shapes can also be utilized in the disclosed methods.

In some embodiments, this step is repeated for a plurality of time points (S333-S334) to obtain a time-varying TOF (that corresponds to an expected reagent concentration because the integral of the expected reagent concentration at a particular time point can be used for computing the speed of sound differential) (S335). For example, the step may be repeated for at least 2 time points, for at least 3 time points, for at least 4 time points, or for at least 8 time points. For example, a determination is made as to whether or not the diffusion time is complete. This diffusion time may be based on the hardware or the type of system being used. For each time interval T, steps S333, S334, and S332 are repeated until the modeling time is complete upon which the modeled reagent concentration is converted to a time-varying TOF signal (S335).

In the experimental embodiment, each of the used candidate diffusion constants $D_{candidate}$ is contained in the following value range:

$$0.01 \leq D_{candidate} \leq 2^{\mu m^2}/_{ms}$$

Figure 5A:
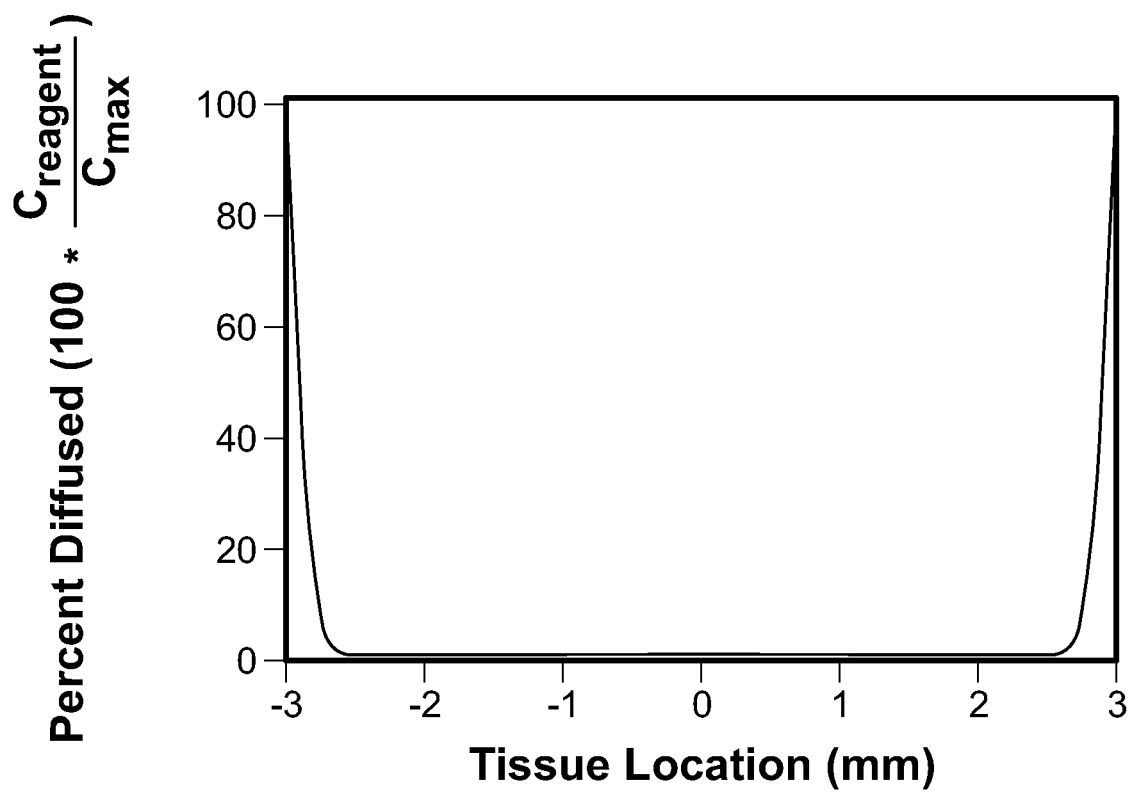
FIG. 5A shows a simulated concentration gradient for a first time point, and for several time points over the course of an experiment.

In some embodiments, the tissue sample was cored with a cylindrical biopsy core punch and therefore may be well approximated by a cylinder. In some embodiments, the solution to the heat equation above was then used to calculate an expected concentration of the reagent ($c_{reagent}$) in the tissue sample and, for the first time point in the experiment, i.e. after 104 seconds of diffusion (based on the time interval between TOF acquisitions used in the system performing the disclosed experiment), the solution representing the concentration of the reagent in the depth direction of the tissue is depicted in FIG. 5A. For example, a particular system may regularly measure a new TOF value for each of a number of different spatial locations which here are also referred to as "pixels". Each "pixel" may thus have an update rate of assigning a new TOF value, e.g. every 104 seconds.

FIG. 5A shows the simulated concentration gradient of 10% NBF into an about 6 mm sample of tissue after about 104 seconds of passive diffusion as calculated from the heat equation in the experimental embodiment. Moreover, these steps were repeated to determine the concentration of the reagent throughout the tissue repeatedly every 104 s over the course of the experiment (8.5 hours long in the experimental embodiment), and the result depicted in FIG. 5B.

Figure 5B:
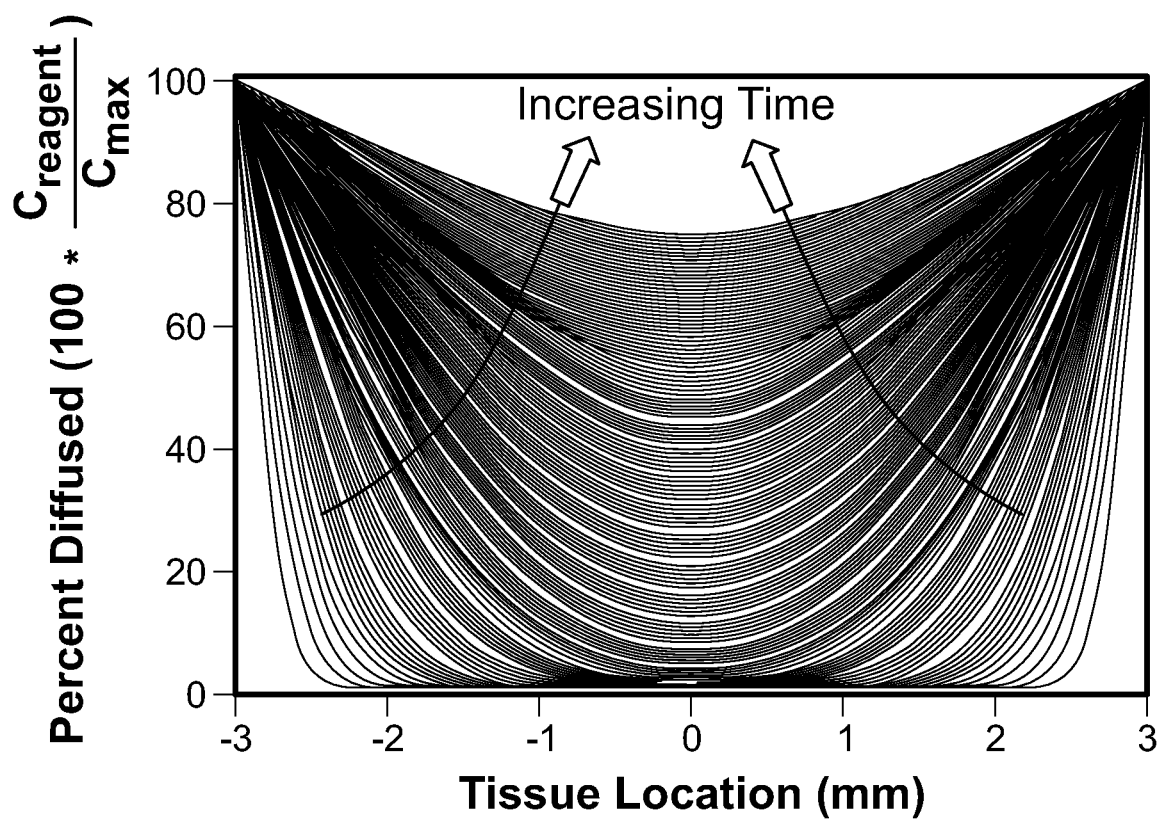
FIG. 5B shows a simulated concentration gradient for a first time point, and for several time points over the course of an experiment.

FIG. 5B shows a plot of $c_{reagent}$ (t, r) displaying the ("expected", "modeled", or "heat equation based") concentration of the reagent at all locations in the tissue (horizontal axis) as well as at all times (curves moving upward).

Referring back to FIG. 3, the results of the reagent modeling steps (S332-S334) may be used to predict the contribution towards the ultrasound signal based on the fact that the ultrasound detection mechanism linearly builds up phase retardation over the depth of the tissue.

In some embodiments, since the ultrasound detects an integrated signal from all tissue in the depth direction, i.e. along the propagation axis of the US beam and will thus be sensitive to the integrated amount of fluid exchange in the depth direction, an "integrated expected" reagent concentration $c_{detected}$, also referred to as "detected reagent concentration", may be calculated. The "detected reagent concentration" is thus not an empirically detected value. Rather, it is a derivative value created by spatially integrating all expected reagent concentrations computed for a particular time point t and for a particular candidate diffusivity constant. The spatial integration may cover, for example, the radius of the tissue sample.

For example, the detected reagent concentration $c_{detected}$ may be calculated using:

$$c_{detected}(t) = \frac{2}{R_o} \int_0^{R_o} c_{reagent}(t, x) dx$$

In some embodiments, the integrated reagent concentration $c_{detected}$ is used to calculate the total amount of reagent at a particular time point. For example, additional volume and/or weight information of the sample may be used for calculating absolute reagent amounts. Alternatively, the reagent amount is computed in relative units, e.g. as a percentage value indicating e.g. the volume fraction [%] of the sample being already diffused by the reagent.

After simulating (i.e., computing based on the heat equation model) the detected concentration of the reagent for a given candidate diffusivity constant and a given time point, that detected concentration may then be converted into a TOF signal (S335) as a linear combination of undiffused tissue and reagent, using:

$$TOF_{tissue}(t, D) = \frac{d_{tissue}}{r_{tissue}(t=0) + \rho c_{detected}(t)(r_{tissue}(t=0) - r_{reagent})}$$

where $r_{tissue}$(t=0) is the speed of sound of undiffused tissue, and p is the volume porosity of the tissue, representing the fractional volume of the tissue sample that is capable of fluid exchange with the bulk reagent. This equation therefore models the change in TOF signal from diffusion as a linear combination of the two distinct sound velocities (tissue and reagent). As the TOF of the respective sound velocities of pure tissue on the one hand and pure reagent on the other hand can easily be determined empirically (e.g. by respective phase-shift based TOF measurements), the amount of the reagent having already diffused into the sample at the particular time point can easily be determined.

In some embodiments, the TOF contribution of the pure tissue sample (being free of the TOF contribution of a bulk fluid such as sample buffers or the tissue fluid) can be obtained by subtracting the TOF contribution measured for the tissue sample including and/or being surrounded by the bulk fluid from the TOF contribution measured for an ultrasound signal having traversed a corresponding inter-transducer distance filled with said bulk fluid only.

Figure 6A:
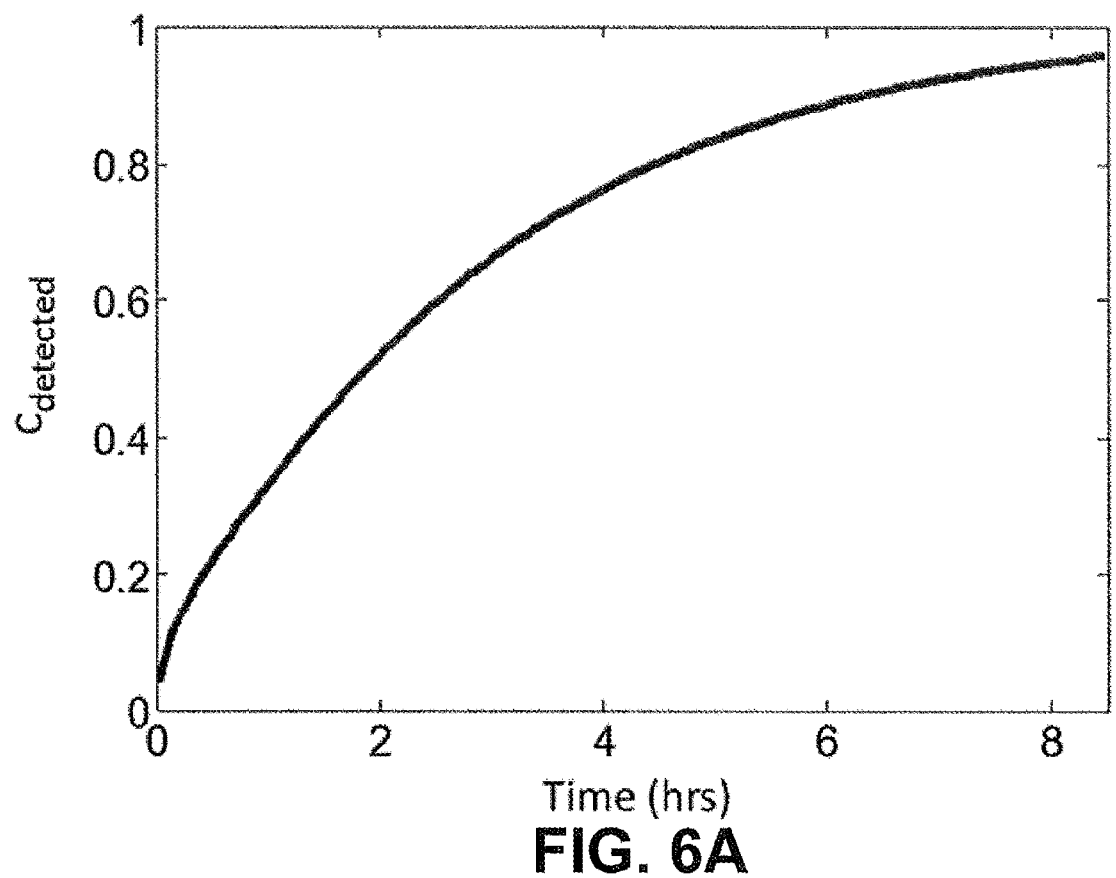
FIGS. 6A and 6B respectively depict plots of the simulated amount of detected concentration of NBF by the ultrasound over the course of the experiment (FIG. 6A) and the simulated (FIG. 6B) TOF signal for the first candidate diffusivity constant.
Figure 6B:
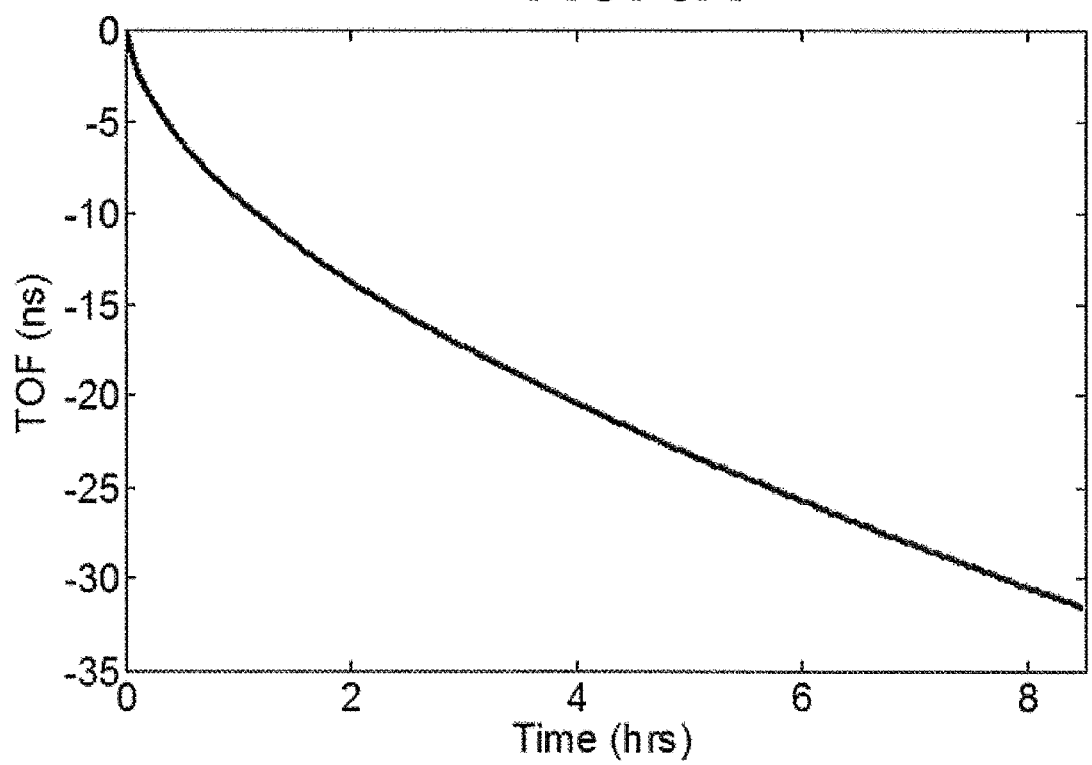

FIGS. 6A and 6B respectively depict a plot of the simulated, "detected" or "integrated" concentration of NBF by the ultrasound over the course of the experiment (FIG. 6A), and a plot of the simulated (or "expected") TOF signal for the first candidate diffusivity constant (FIG. 6B, where D=0.01 µm2/ms). The TOF signals in FIG. 6B are computed as derivatives of the respective integrated concentration of the reagent.

At this point, the method generally correlates (S336) the modeled (or "simulated" or "expected") TOF with an experimental TOF determined by measuring different spatial regions of interest (ROIs), also referred to as "candidate diffusivity points", within the tissue sample and determining a minimum of an error function to obtain a true diffusivity constant. In this example, each modeled TOF for the specific diffusion constant selected in the range specified by (S322) is correlated with the experimental TOF (S336), and determination is made as to whether or not an error is minimized (S337). If the error is not minimized, the next diffusion constant is selected (S338) and the modeling process (S332-S335) is repeated for the new diffusion constant. If it is determined that the error is minimized (S337) based on correlation (S336), then the true diffusivity constant is determined (S339) and the method ends.

Figure 4:
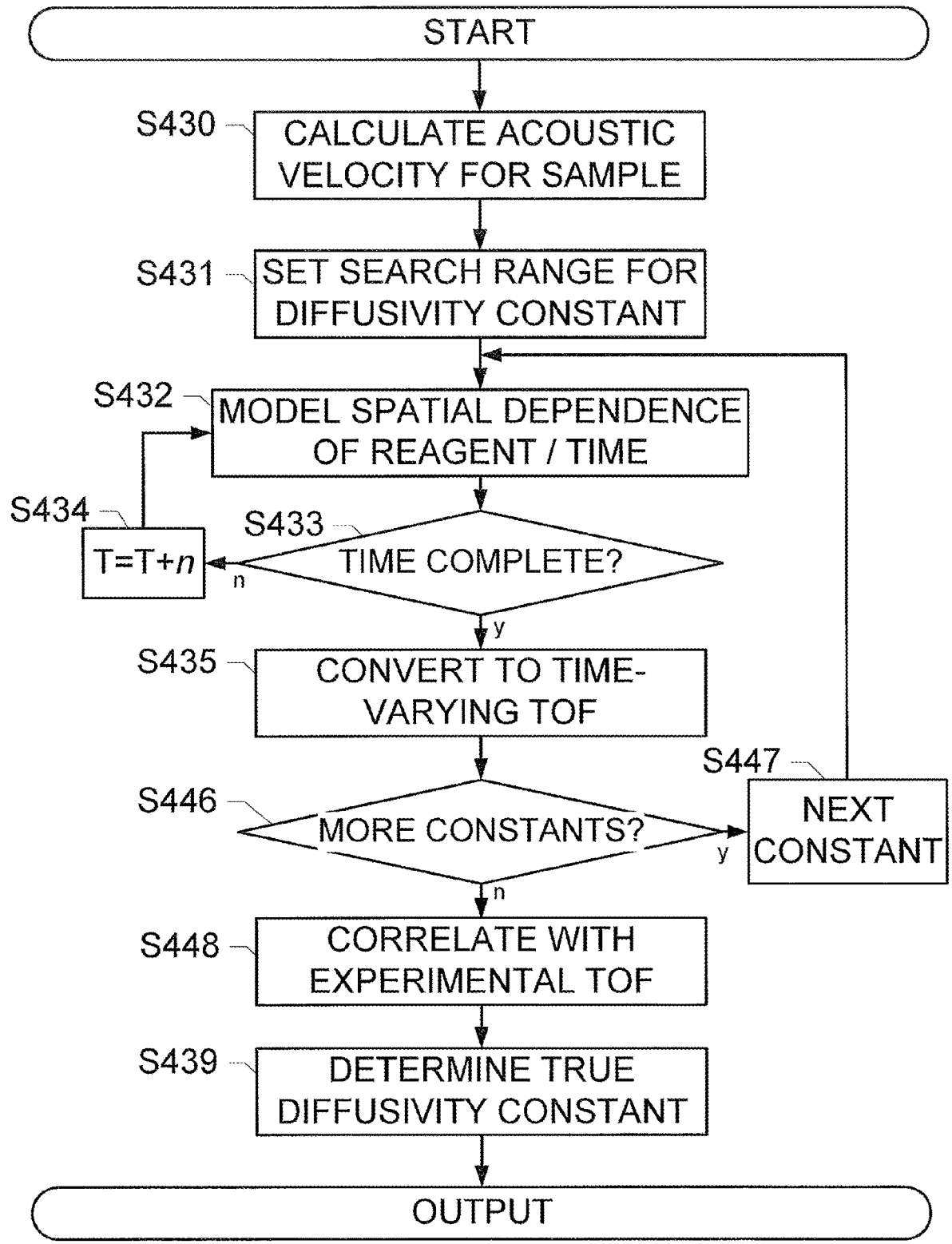
FIG. 4 shows an alternate method for obtaining a diffusivity coefficient for a tissue sample.
Figure 7:
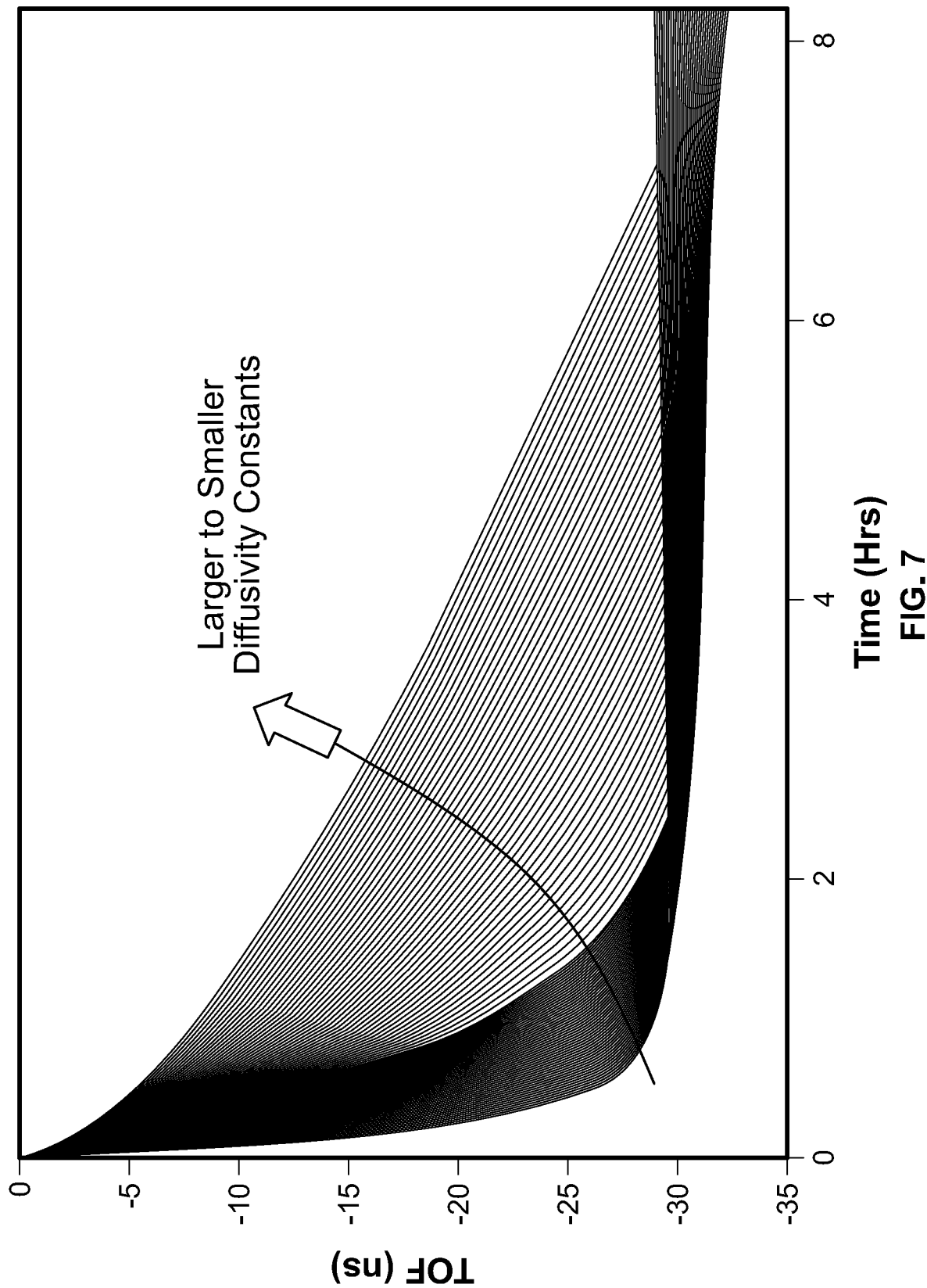
FIG. 7 depicts temporally varying TOF signals calculated for all potential diffusivity.

FIG. 4 shows an alternative method whereby all candidate diffusivity constants are first used to perform the modeling, based on steps S446-S447 and the correlation (S448) is performed after all the diffusivity constants are processed. A depiction of the temporally varying TOF signal calculated for all potential diffusivity constants is shown in FIG. 7. For example, FIG. 7 depicts simulated TOF traces over the 8.5 hour experiments for 6 mm tissue samples with diffusivity constants ranging from 0.01 to 2.0 µm2/ms. In the embodiment of FIG. 4, the error minimization is performed within true diffusivity constant determination step S439.

In either case, the experimental TOF must be determined for the correlation to take place. In some embodiments, the experimental TOF may be determined by measuring different spatial regions of interest (ROIs) within the tissue. Each signal has the contribution from background reagent subtracted out to isolate the contribution from active diffusion into the tissue. Individual TOF trends are temporally smoothed via filtering. These spatially distinct TOF trends are then spatially-averaged to determine the average rate of 10% NBF diffusion into the tissue.

Figure 8B:
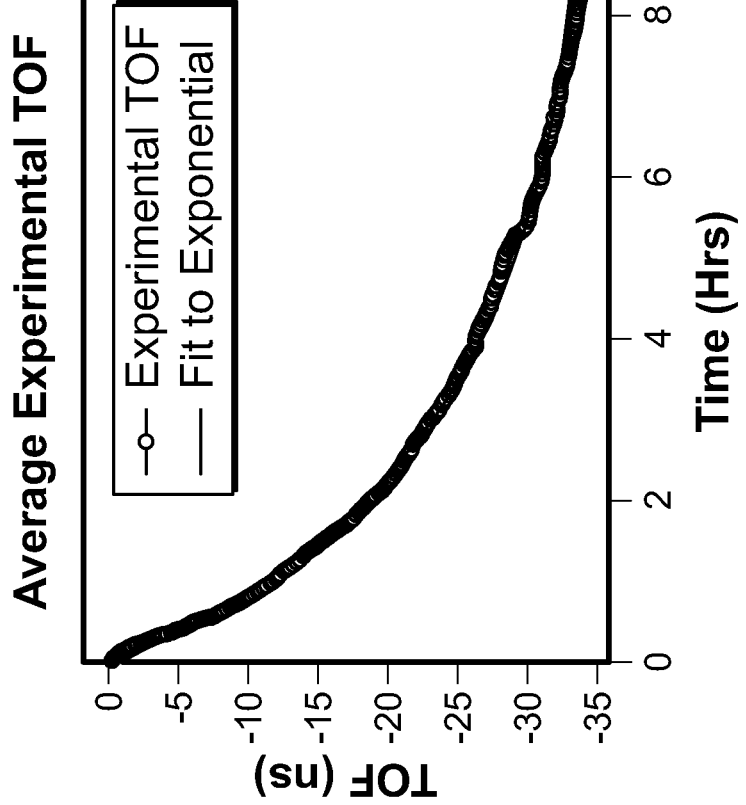
FIG. 8B depicts a spatially-averaged TOF signal collected from a 6 mm piece of human tonsil sample.
Figure 8A:
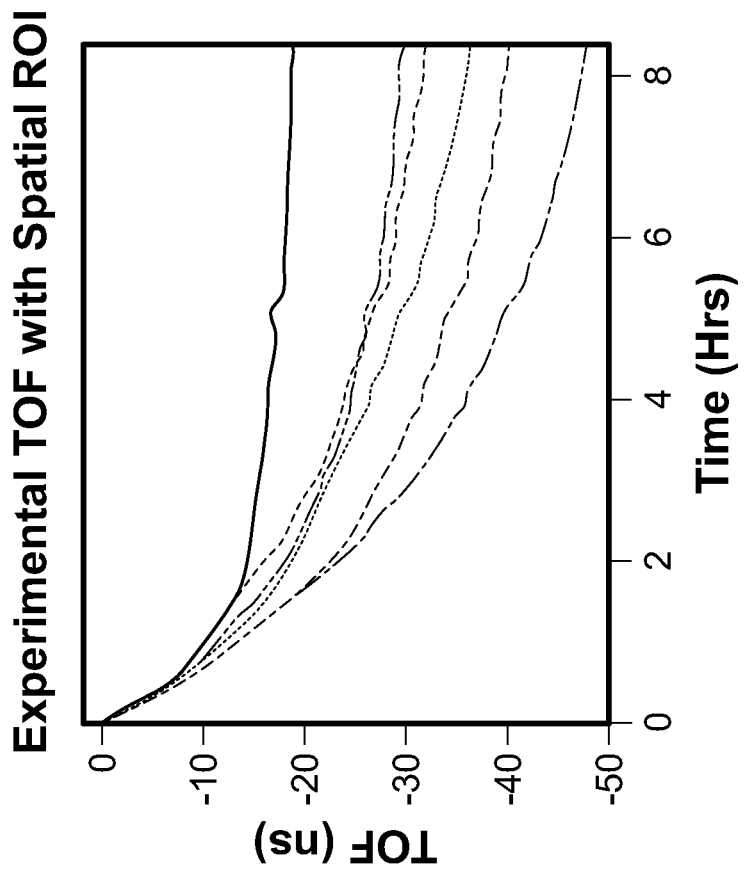
FIG. 8A depicts experimentally calculated TOF trends collected from a 6 mm piece of human tonsil sample.

FIGS. 8A and 8B respectively depict experimentally calculated TOF trends collected from a 6 mm piece of human tonsil sample (FIG. 8A) and spatially-averaged TOF signals (FIG. 8B) representing the average rate and amount of fluid exchange of 10% NBF into the tissue.

The average rate of diffusion into the tissue is highly correlated to a single exponential signal (depicted by the dashed line in FIG. 8B), and derived by:

$$TOF_{experimental}(t) = Ae^{-t/\tau_{experimental}} + \text{offset}$$

where A is the amplitude of the TOF in nanoseconds (i.e., the TOF difference between the undiffused and fully diffused tissue sample), $\tau_{experimental}$ is the sample's decay constant representing the time required for the TOF to decay to 37% of its amplitude or equivalently to be 63% decayed and offset is a vertical offset of the above given decay function.

The 63% can be derived by the following calculation: at time $t=\tau$, $TOF(\tau)=Ae(-tau/tau)=Ae-1=A/e=A/2.72=0.37*A$.

In some embodiments, it is assumed that the TOF decreases with an increase in reagent concentration in the sample, but the method would likewise be applicable for reagents which increase the measured TOF upon diffusing into the sample. In the 6 mm piece of human tonsil of the experimental embodiment, $\tau_{experimental}=2.83$ hours. Thus, from a plurality of TOFs having been experimentally determined for a plurality of consecutive time points, a decay constant of the tissue sample can be computed, e.g. by plotting the amplitudes of the TOF signal over time, analyzing the plot for identifying the offset and resolving the above solution for the decay constant.

In some embodiments, the error correlation (S336 in FIG. 3, S448 in FIG. 4) is performed to determine an error of the modeled ("expected") TOF vs. the experimental TOF. Having calculated simulated and experimental TOF signals, a difference between the two signals may be calculated to see whether or not the candidate diffusivity constant minimizes the difference between the two signals (S337).

In some embodiments, the error function may be computed in different ways, for instance, using one of the following equations:

$$\text{Error}(D) = \frac{1}{N}\sum_{t=1}^{N}(TOF_{simulated}(t,D) - TOF_{experimental}(t))^2$$

$$\text{Error}(D) = (\tau_{simulated}(D) - \tau_{experimental})^2$$

In some embodiments, the first error function calculates the point-by-point difference between simulated ("modeled", "expected") and experimentally measured TOF signals.

In some embodiments, the second error function exclusively compares the rate of diffusion between the simulated and modeled TOF signal by calculated the sum-squared differences between each's decay constant. In some embodiments, the experimental decay constant $\tau_{experimental}$ can be obtained experimentally as described above. In some embodiments, the "modeled", "expected" or "simulated" decay constant $\tau_{simulated}$ can be derived analogously from the modeled ("expected") TOFs signal of consecutive time points which also follow a decay function.

In some embodiments, based on the output of the error function, a true diffusivity constant may be determined (S339). In some embodiments, the true diffusivity constant is calculated as the minimum of the error function, for instance:

$$D_{reconstructed} = \arg\min(\text{error}(D))$$

This equation enables a determination of the candidate diffusivity coefficient that produce a TOF signal as close as possible to the experimental data.

For example, with respect to the method depicted in FIG. 3, the error function may be determined for each candidate diffusivity constant until the error is minimized (S337). Alternatively, in the method of FIG. 4, the correlation with experimental TOF may be performed after all candidate diffusivity constants are processed, upon which the determination (S439) of the true diffusivity constant includes determining a minimum of the error function. In some embodiments, the minimum of the error function is ideally zero, or as close as possible to zero. Any error function known in the art may be used with the goal of minimizing the error between the modeled versus experimental coefficients disclosed herein.

Figure 9A:
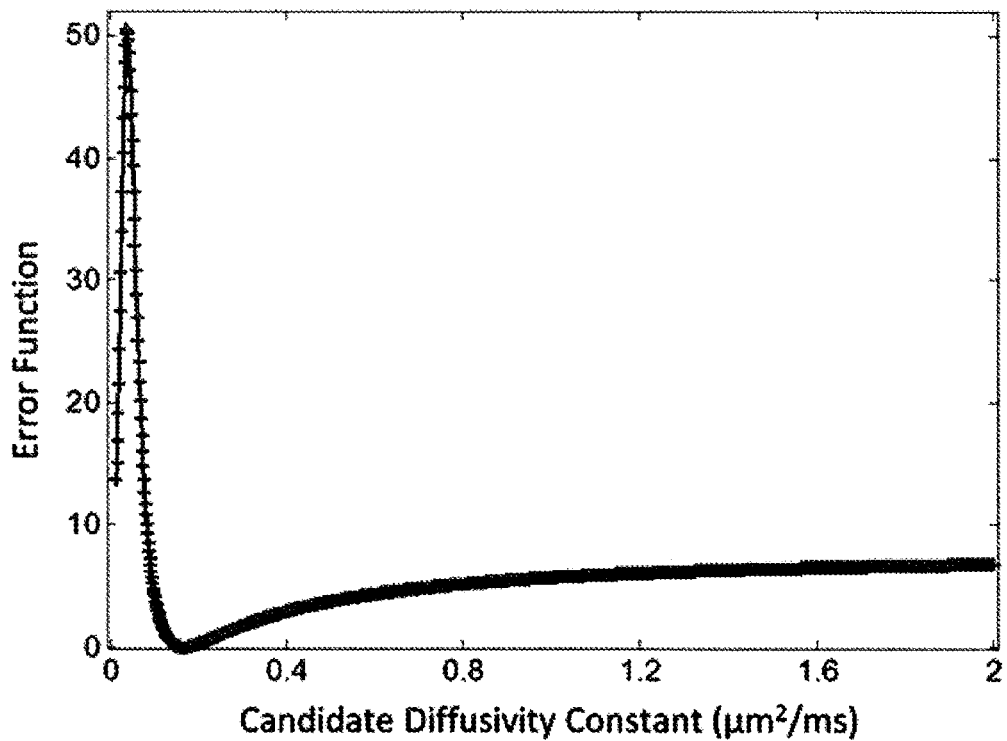
FIGS. 9A and 9B respectively show plots of the calculated error function between simulated (FIG. 9A) and experimentally measured (FIG. 9B) TOF signals as a function of candidate diffusivity constant and a zoomed-in view of the error function.
Figure 9B:
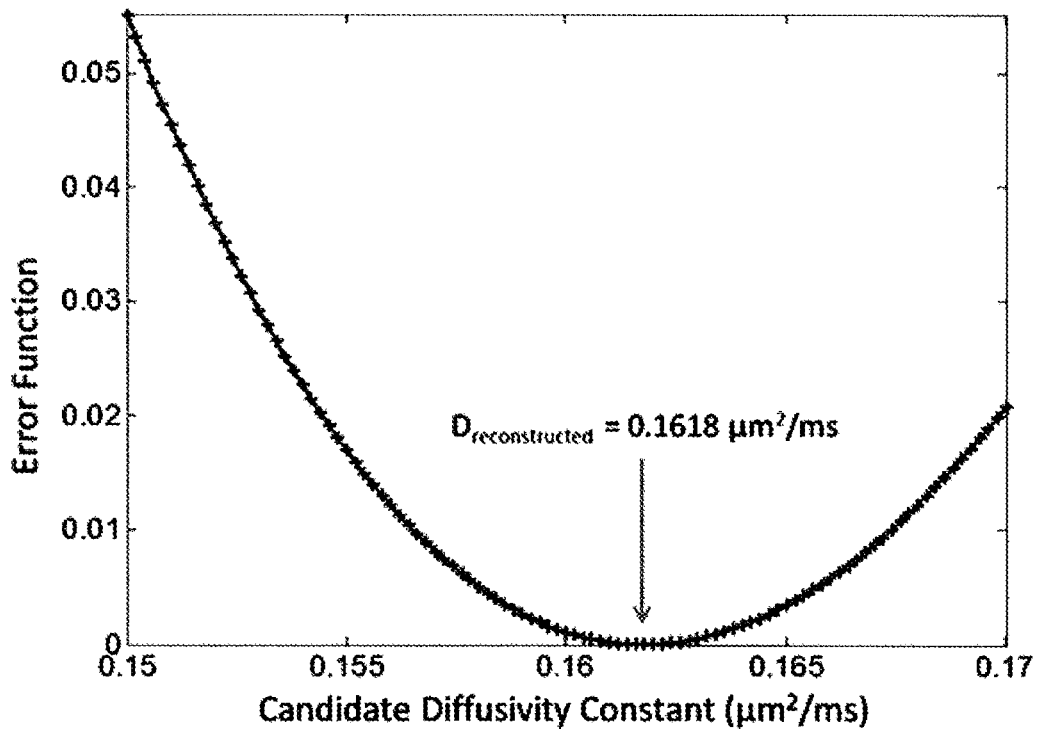
Figure 10:
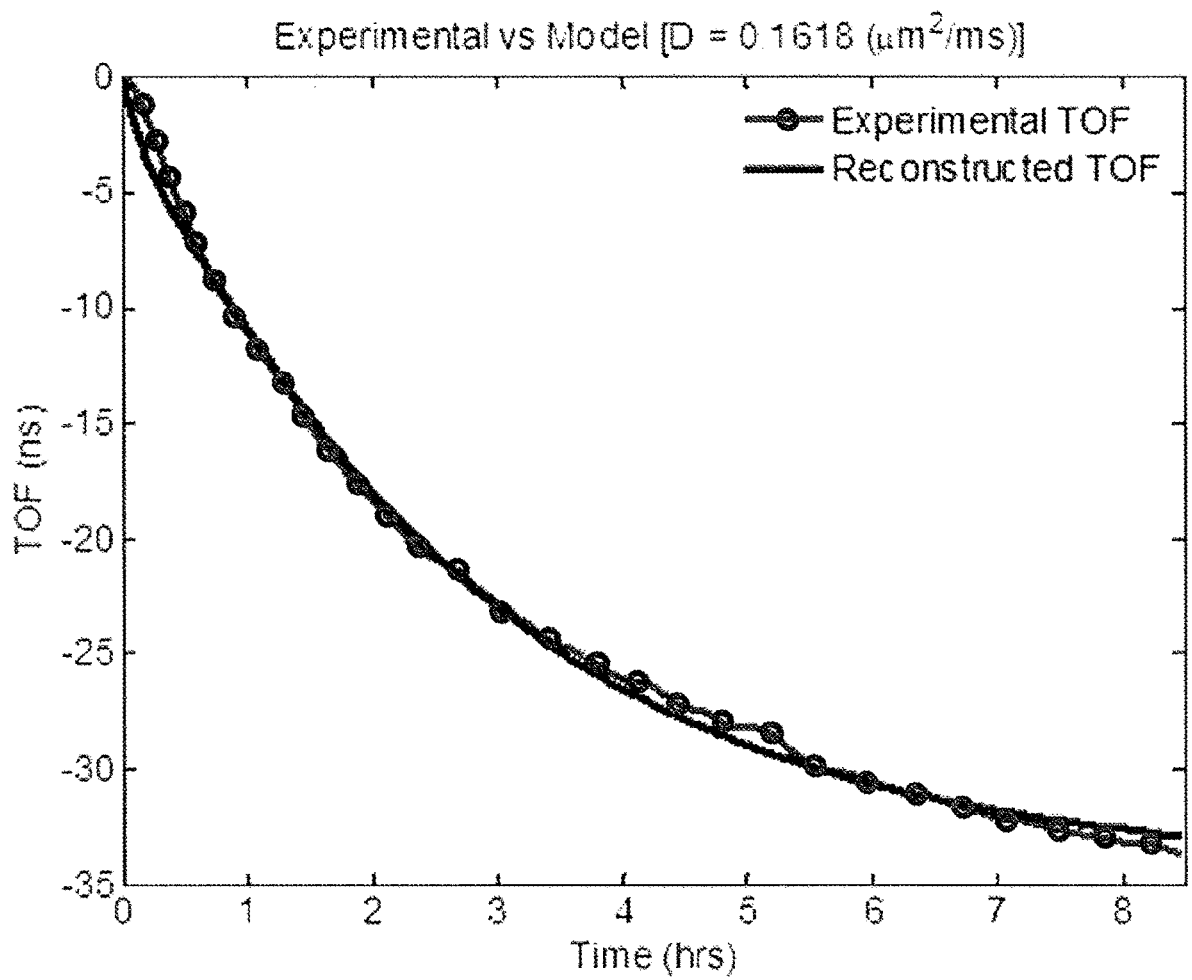
FIG. 10 depicts a TOF trend calculated with a modeled diffusivity constant plotted alongside an experimental TOF.

FIGS. 9A and 9B respectively show a plot of the calculated error function between simulated and experimentally measured TOF signals as a function of candidate diffusivity constant (FIG. 9A, $\Delta D \approx 10^{-5}$ µm²/ms.), and a zoomed-in view of the error function (FIG. 9B). In the experimental embodiment, the minimum of the error function was calculated to be at D=0.1618 µm²/ms. The validity of the reconstructed constant was tested and used to back-simulate a TOF trend. FIG. 10 depicts the TOF trend calculated with this diffusivity constant and plotted alongside the experimental TOF measured with the 6 mm piece of human tonsil. In FIG. 10, the plot shows the experimentally calculated TOF trend from a 6 mm piece of human tonsil in 10% NBF (dotted line) and the modeled TOF trend for $D_{reconstructed}$=0.168 µm²/ms (solid line). In this embodiment, $\tau_{experimental}$=2.830 hrs and $\tau_{simulated}$=2.829 hrs.

Figure 11B:
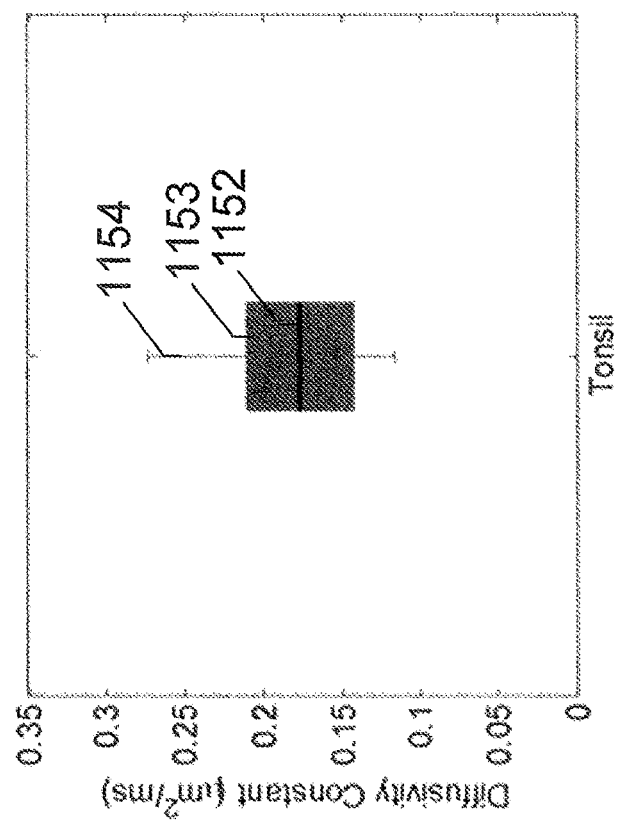
FIGS. 11A and 11B each show reconstructed diffusivity constants for the multiple tissue samples.
Figure 11A:
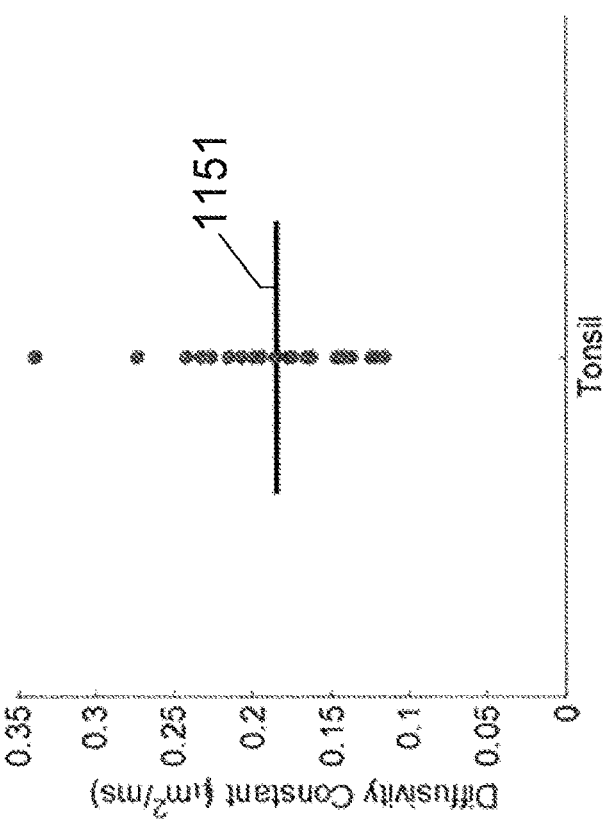

Furthermore, this same procedure was repeated for several specimens of 6 mm human tonsil samples, with successfully reconstructed diffusivity constants for all samples, as depicted in FIGS. 11A and 11B. FIG. 11A shows reconstructed diffusivity constants for the 23 samples of 6 mm human tonsil. Line 1151 represents the average. FIG. 11B shows a box and whisker plot displaying the distribution of the reconstructed diffusivity constants. Line 1152 represents the median value, and the box 1153 extends from the 25-75 percentiles, with whiskers 1154 extending from the 5-95 percentiles. Overall, the algorithm predicted 6 mm tonsils samples have an average diffusivity constant of 0.1849 µm2/ms with a relative tight distributed producing a standard deviation of 0.0545 µm2/ms.

Figure 12A:
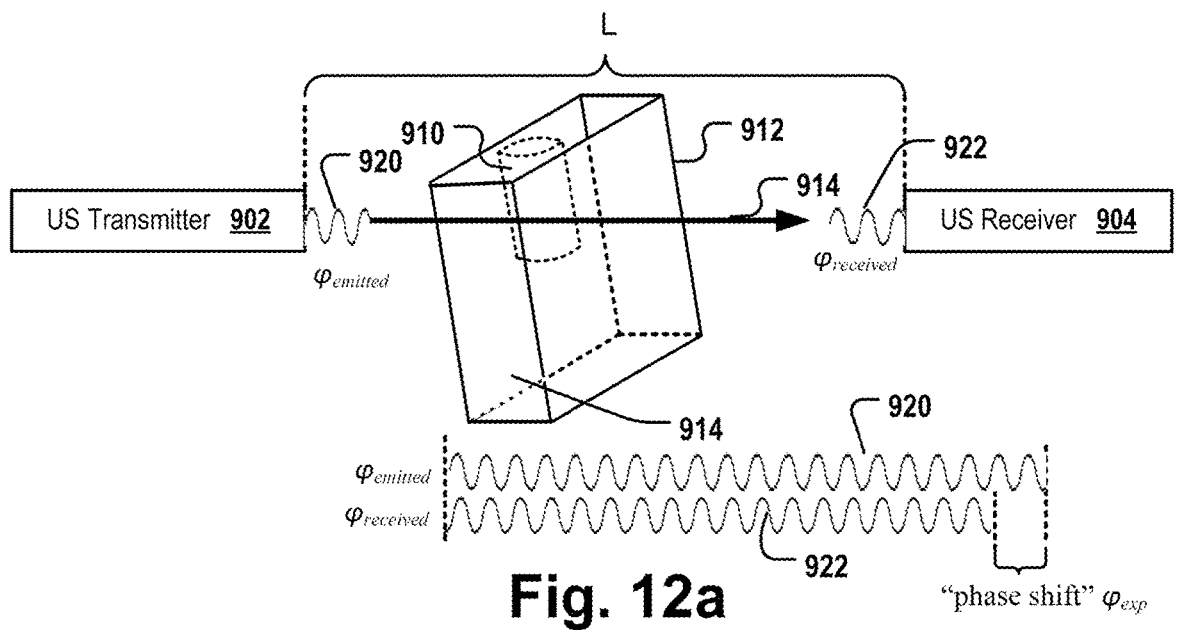
FIG. 12A depicts a system comprising a transmitter and a receiver pair for measuring TOF via phase shifts.

FIG. 12A shows a system for monitoring the time-of-flight of an ultrasound signal according to embodiments of the disclosure. In some embodiments, the ultrasound-based time-of-flight (TOF) monitoring system may comprise one or more pairs of transducers (e.g. TA0040104-10, CNIRHurricane Tech) for performing the time-of-flight measurements based on a phase shift of the ultrasound signals. In the embodiment depicted in FIG. 12A, the system comprises at least one pair of transducers consisting of an ultrasound ("US") transmitter 902 and an ultrasound receiver 904 which are spatially aligned to each other such that a tissue sample 910 which is placed in the beam path 914 from the transmitter to the receiver is located at our close to the common foci of said two transducers 902, 904. The tissue sample 910 can be contained, for example, in a sample container 912 (e.g. a standard histological cassette like "CellSafe 5" of CellPath or a biopsy capsule like "CellSafe Biopsy Capsules" of CellPath) that is filled with a fixation solution. Phase-shift based TOF measurements are performed before and after the biopsy capsule 912 is filled with the fixation solution and while the solution slowly diffuses into the sample. The one transducer acting as the transmitter sends out an acoustic pulse that traverses the tissue and is detected by the other transducer acting as the receiver. The total distance between two transducers constituting a transmitter-receiver transducer pair is referred to as "L". The total time the ultrasound signal needs to traverse the distance between the transmitter 902 and the receiver 904 may be referred to as time-of-flight of said signal. The transmitter 902 may be focused, for example, at about 4 MHz and support a frequency sweep range of between about 3.7 and about 4.3 MHz.

In some embodiments, the distance L is assumed to be known, at least approximately. For example, the distance of the transducers may be accurately measured (e.g. by optic, ultrasound based or other measurement techniques) or may be disclosed by a manufacturer of the acoustic monitoring system.

The transmitting transducer 902 is programmable with a waveform generator (e.g. AD5930 from Analog Devices) to transmit a sinusoidal wave (or "sinusoidal signal") for a defined frequency for a defined time interval, e.g. several hundred microseconds. That signal is detected by the receiving transducer 904 after traversing the fluid and/or tissue. The received ultrasound signal 922 and the emitted (also referred to as "transmitted") sinusoid signal 920 are compared electronically with a digital phase comparator (e.g. AD8302, Analog Devices).

A "received" "signal" (or wave) as used herein is a signal whose properties (phase, amplitude, and/or frequency, etc.) are identified and provided by a transducer, e.g. receiver 904, that receives said signal. Thus, the signal properties are identified after said signal has passed a sample or any other kind of material.

A "transmitted" or "emitted" "signal" (or wave) as used herein refers to a signal whose properties (phase, amplitude, and/or frequency, etc.) are identified by a transducer, e.g. transmitter 902 that emits the signal. Thus, the signal properties are identified before the signal has passed a sample or any other kind of material.

For example, the transmitted signal may be characterized by signal properties identified by the transmitting transducer, the received signal may be characterized by signal properties measured by the receiving transducer, whereby the transmitting and the receiving transducer are operatively coupled to a phase comparator of the acoustic monitoring system.

Figure 12B:
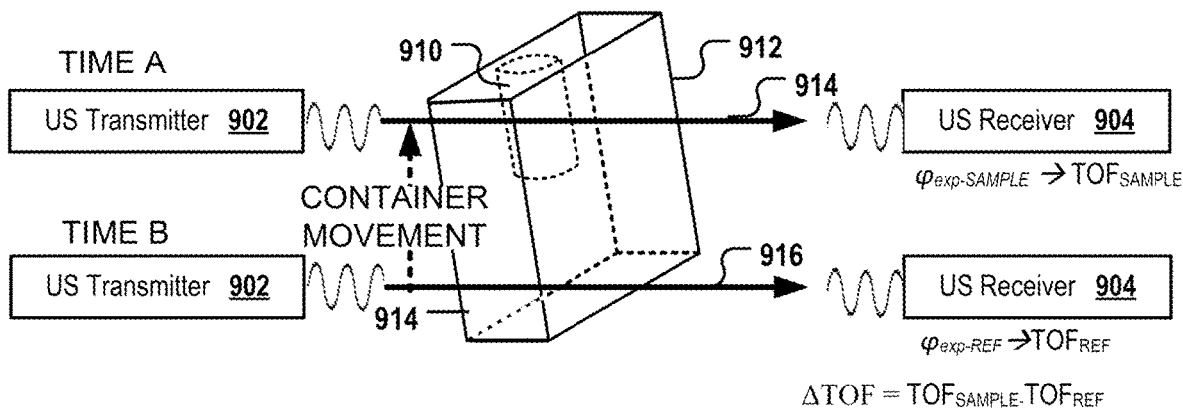
FIG. 12B depicts a system comprising a transmitter and a receiver pair for measuring TOF via phase shifts.

FIG. 12B depicts the determination of the TOF for the pure reagent from which the speed of the sound wave for the beam path crossing the pure reagent without the sample can be inferred. In this embodiment, the one or more transducer pairs 902, 904 and the sample container 912 can be moved relative to each other. Preferentially, the system comprises a container holder capable of repositioning the container 912 such that the US beam traverses a region 914 of the container that solely comprises the fixation solution but not the tissue.

At a time, A, when the tissue is not yet immersed in a fixation solution, the TOF for a sound signal traversing the distance between the transducers is obtained via a measured phase shift $\varphi_{exp}$ as described for FIG. 12A. In this case, the beam path crosses a sample being free of the reagent. As L is known, the measured TOF can be used for computing the speed of the sound signal for traversing the distance in the presence of the undiffused sample.

At a time, B, when the tissue is immersed in a fixation solution, the TOF for a sound signal traversing the distance between the transducers is obtained via a measured phase shift $\varphi_{exp}$. In this case, the beam path crosses a sample container comprising only the reagent, not the sample (or crosses the sample container at a position that is free of the sample). As L is known, the measured TOF can be used for computing the speed of the sound signal for traversing the distance in the presence of the reagent (and the sample container) only, i.e., in the absence of the sample in the beam path.

Time A and time B may represent identical time points in case a further transducer pair is configured for performing the two measurements in parallel.

III. EXAMPLES

An investigation of the disclosed method of determining reagent concentrations across space and time within a sample, and across tissue sample types, was conducted. Samples were monitored during cold immersion in NBF using a TOF system as described above and extracted experimental TOF data over time was obtained. Following TOF analysis, samples were warmed to fix the tissues and then processed in a tissue processor to prepare sample paraffin blocks. Blocks were sliced on a microtome and mounted on microscope slides and stained according to standard protocols, and in some instances read by qualified slide readers to assess stain quality.

Figure 13:
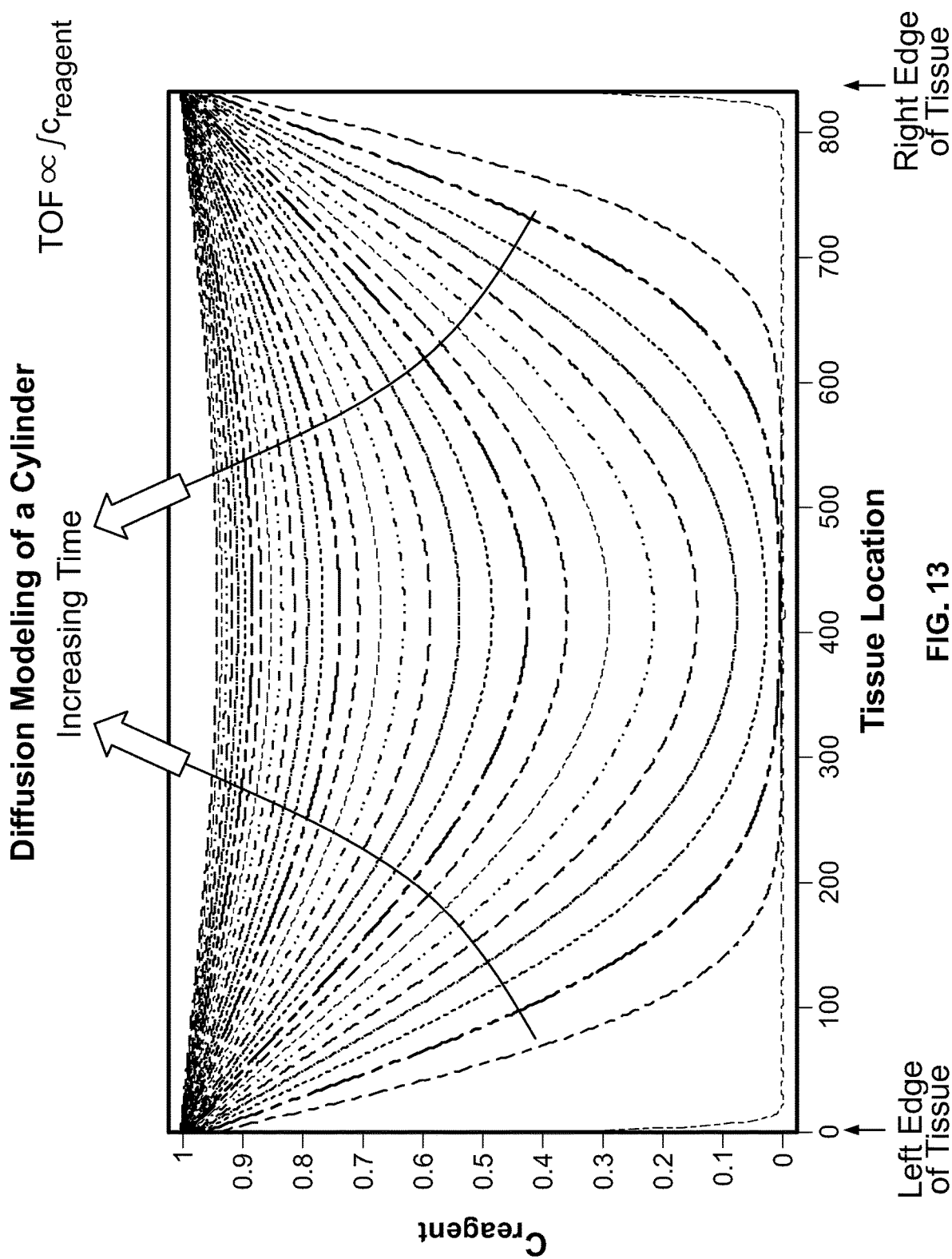
FIG. 13 shows a model of diffusion of a reagent into a cylindrical object, such as a cylindrical tissue core.

FIG. 13 shows a model of diffusion of a reagent into a cylindrical object, such as a cylindrical tissue core. As can be seen, the reagent concentration rapidly increases first at the edges of the tissue sample, and that the concentration of the reagent at the center increases slowly (if at all) at first, lagging the concentration changes seen at the edges of the sample, and then accelerating at later time points, before beginning to slow again. In this model:

$$TOF \propto \int c(\text{reagent})$$

In comparison to FIG. 5B, the changes in concentration over time are more variable in rate than are the changes seen for percent diffused. This is not unexpected as percent diffusion is a measured average across the entire sample, whereas the concentration changes are location specific. Furthermore, since sample porosity scales with A in the following equation:

$$TOF_{experimental}(t) = Ae^{-t/\tau_{experimental}} + \text{offset},$$

once the diffusivity constant is known, candidate porosities can be used to calculate simulated TOF curves and compared to experimental TOF curves to generate an error, which error can be minimized. The error function may be computed in different ways, for instance, using one of the following:

$$\text{Error (porosity)} = \frac{1}{N}\sum_{t=1}^{N}(TOF_{simulated}(t, \text{porosity}) - TOF_{experimental}(t))^2$$

$$\text{Error }(D) = (\tau_{simulated}(\text{porosity}) - \tau_{experimental})^2$$

The first error function calculates the point-by-point difference between simulated ("modeled", "expected") and experimentally measured TOF signals.

The second error function exclusively compares the rate of diffusion between the simulated and modeled TOF signal by calculating the sum-squared differences between each's decay constant. The experimental decay constant $\tau_{experimental}$ can be obtained experimentally as described above. The "modeled", "expected" or "simulated" decay constant $\tau_{simulated}$ can be derived analogously from the modeled ("expected") TOFs signal of consecutive time points which also follow a decay function.

Based on the output of the error function, a true porosity may be determined. The true porosity is calculated as the minimum of the error function, for instance:

$$P_{reconstructed} = \arg\min(\text{error}(\text{porosity}))$$

Once the porosity of the sample is determined, a concentration of a reagent at a particular point in space and time can be calculated using the following equation:

$$\text{reagent\_conc} = (\% \text{ diffused})(\rho)\left(\frac{MW\text{g\_reagent}}{1 \text{ liter}}\right)\left(\frac{1 \text{ mol}}{MW\text{g\_reagent}}\right)$$

Figure 14:
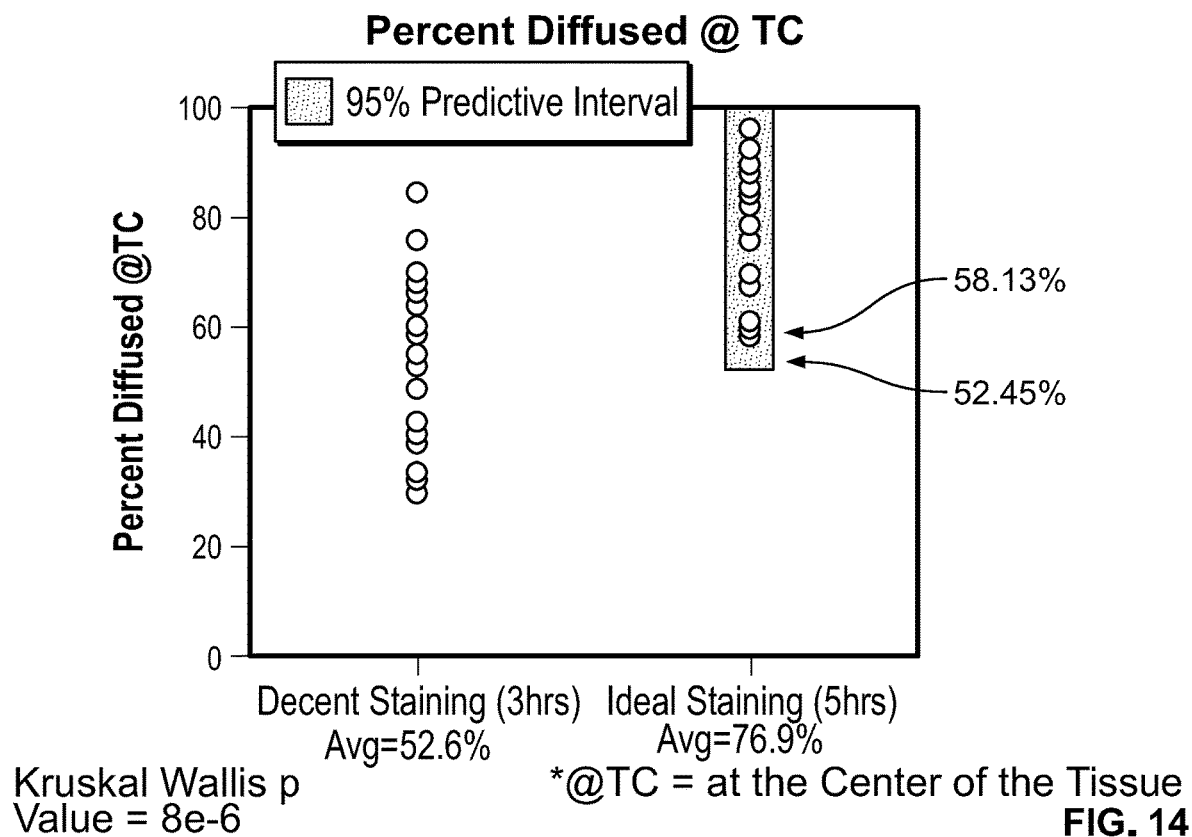
FIG. 14 shows a typical distribution of the percent diffusion of a reagent into the tissue sample center at 3 hours and 5 hours.

FIG. 14 shows for comparison a typical distribution of the percent diffusion of a formalin solution into the centers of tonsil tissue core samples (approximately, 6 mm cylinders) at 3 hours and 5 hours, wherein a 3 hour immersion of a sample yields decent staining whereas a 5 hour immersion yields "ideal" staining. On average, a sample subjected to a 3 hour immersion will reach a 52.6% percent diffusion at tissue center and a sample subjected to a 5 hour immersion will reach an average percent diffusion of 76.9% diffused. The 95% predictive interval at 5 hours indicates that a sample needs to be at least 52.45% diffused at the center to achieve "ideal" staining as judged by pathologist review.

Figure 15:
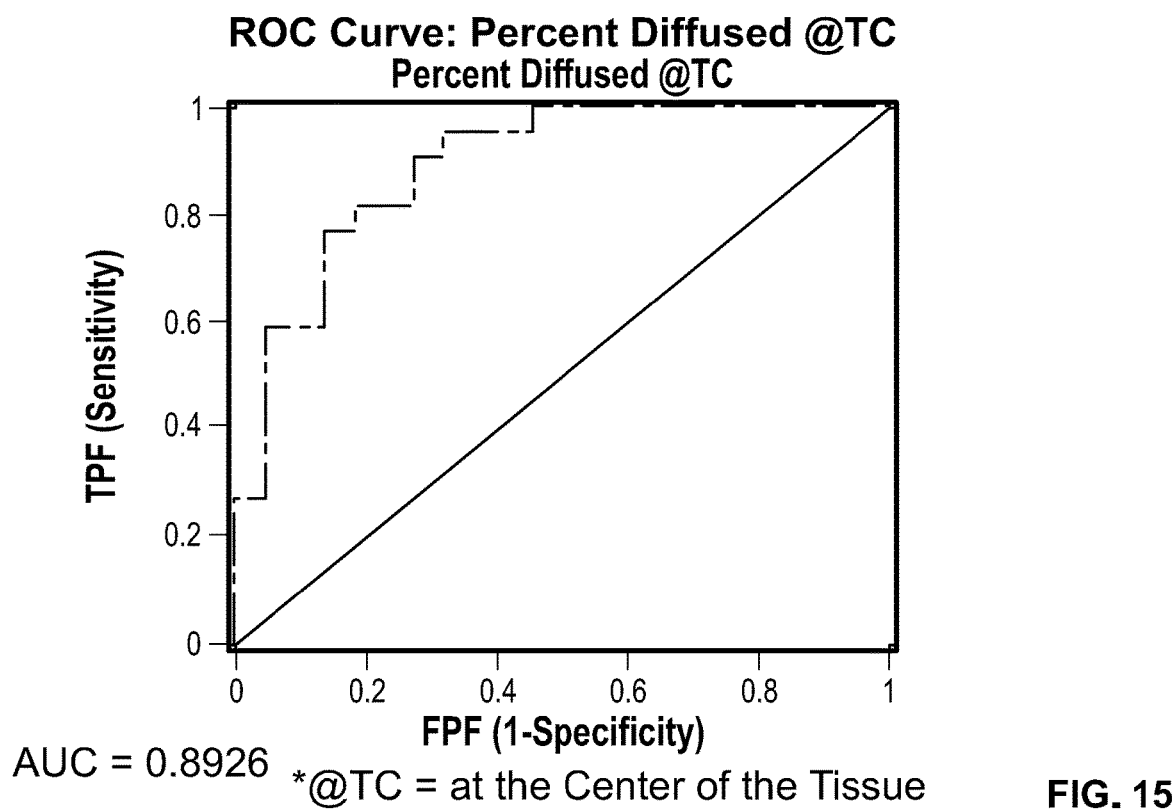
FIG. 15 shows a typical ROC curve of staining quality (based on sensitivity and specificity) based on percent diffusion at the tissue sample center.

FIG. 15 shows for comparison an ROC curve of staining quality (sensitivity and specificity) based on percent diffusion at the tissue sample center. In this instance, using percent diffusion at tissue center yields an area under the curve (AUC) of 0.8926 for prediction of staining quality based on a measurement of percent diffused at tissue center.

Figure 16:
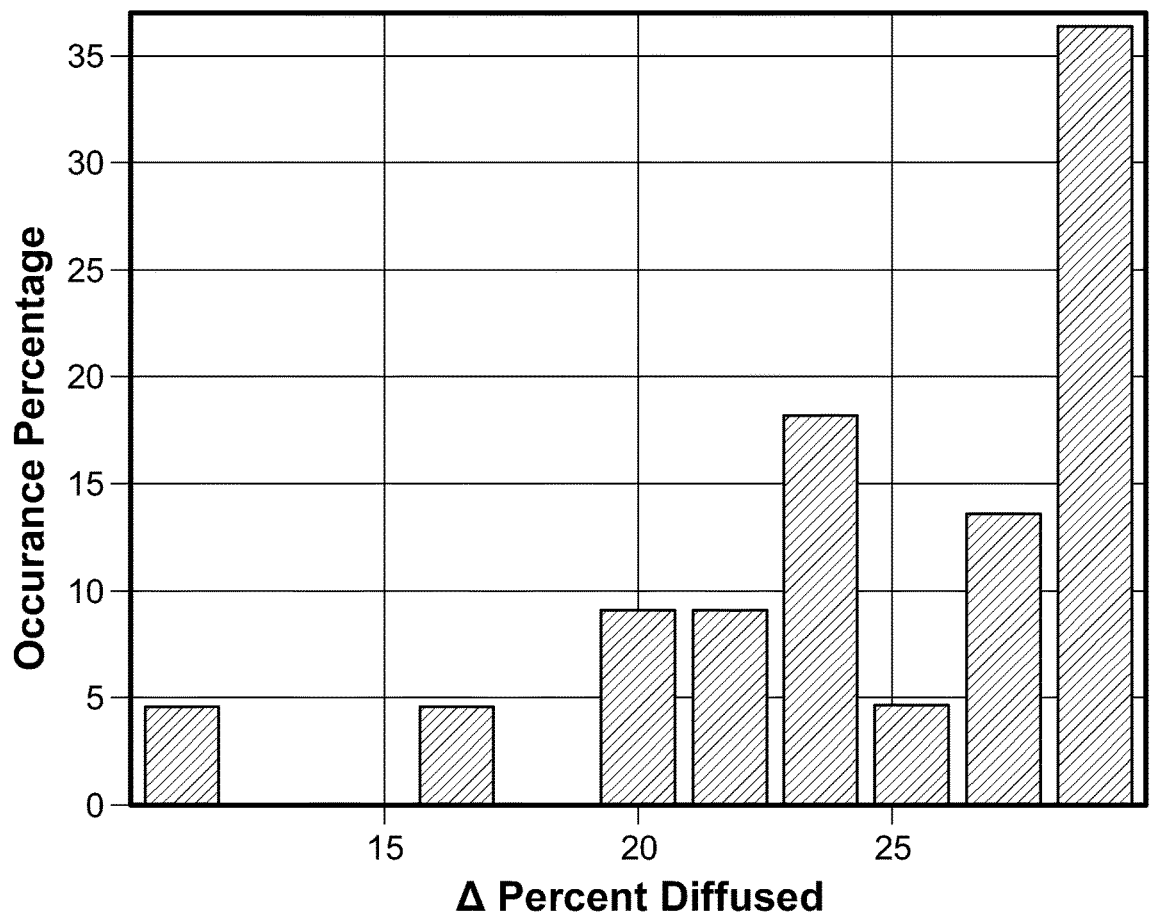
FIG. 16 shows a typical graph of the differential in percent diffusion at the tissue sample center between about 3 hours and about 5 hours of exposure to a reagent.

FIG. 16 shows for comparison a typical graph of the differential in percent diffusion measured at the tissue sample center between about 3 hours and about 5 hours of exposure to a reagent, with the result that the average difference between about 3 hours and about 5 hours of diffusion is about 24.3% at the center of the tissue.

Figure 18:
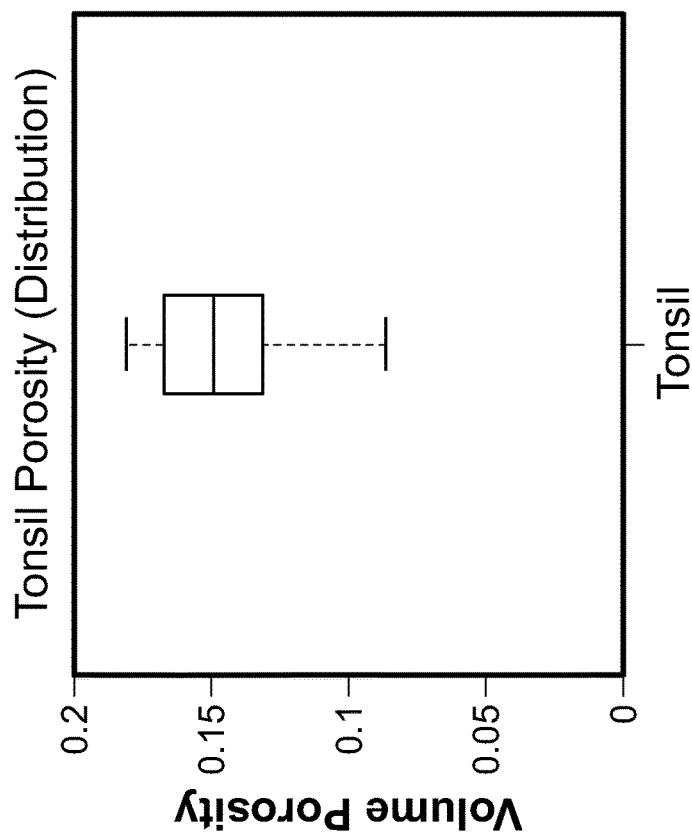
FIG. 18 shows a box and whisker distribution of tonsil tissue volume porosity determined according to a disclosed embodiment.
Figure 17:
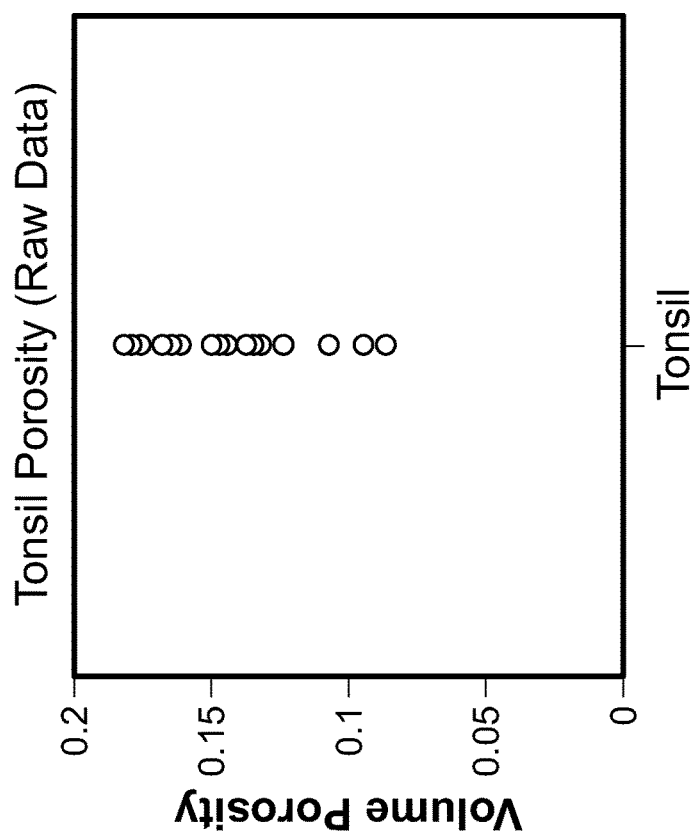
FIG. 17 shows the raw data distribution of tonsil tissue volume porosity determined according to a disclosed embodiment.

Turning now to results obtained using the disclosed method of determining reagent concentrations at particular spatial points within a tissue sample from TOF data, FIG. 17 shows a raw data distribution of determined tonsil tissue volume porosities for several samples. FIG. 18 shows a corresponding box and whisker distribution of the data of FIG. 17 for determined tonsil tissue volume porosities. As can be seen, tonsil tissue in particular exhibits an average porosity of about 0.15.

Figure 19:
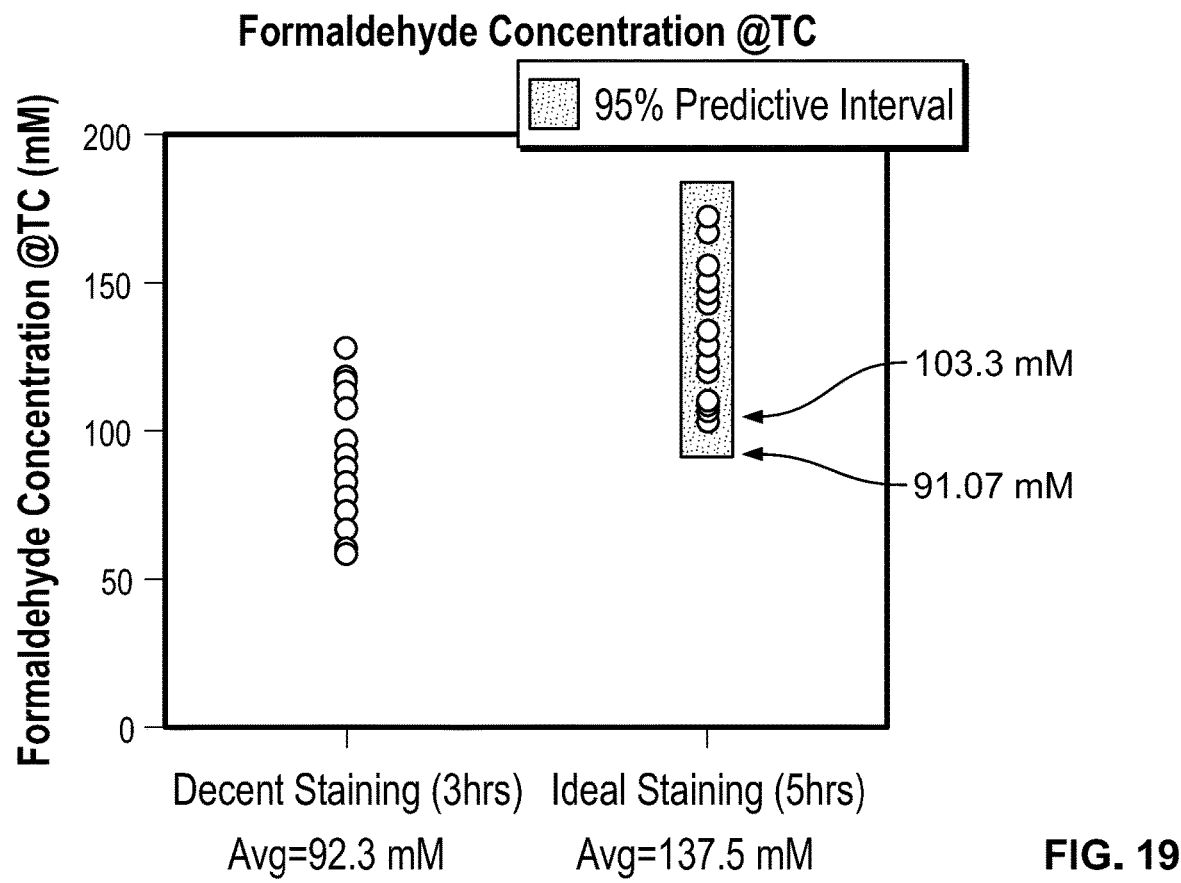
FIG. 19 shows a typical distribution of formaldehyde concentration at the tissue sample center as determined according to a disclosed embodiment at 3 hours and 5 hours.

FIG. 19 shows a typical distribution of formaldehyde concentrations at the tissue sample center for tonsil tissue core samples (approximately 6 mm cylinders) at 3 hours and 5 hours, wherein an about 3 hour immersion of a sample yields decent staining whereas a 5 hour immersion yields "ideal" staining. On average, a sample subjected to an about 3 hour immersion will reach a 92.3 mM formaldehyde concentration at tissue center and a sample subjected to a 5 hour immersion will reach an average concentration at tissue center of 137.5 mM. The 95% predictive interval at 5 hours indicates that a sample should have achieved at least 91.07 mM formalin at tissue center during fixation to achieve "ideal" staining as judged by pathologist review.

Figure 20:
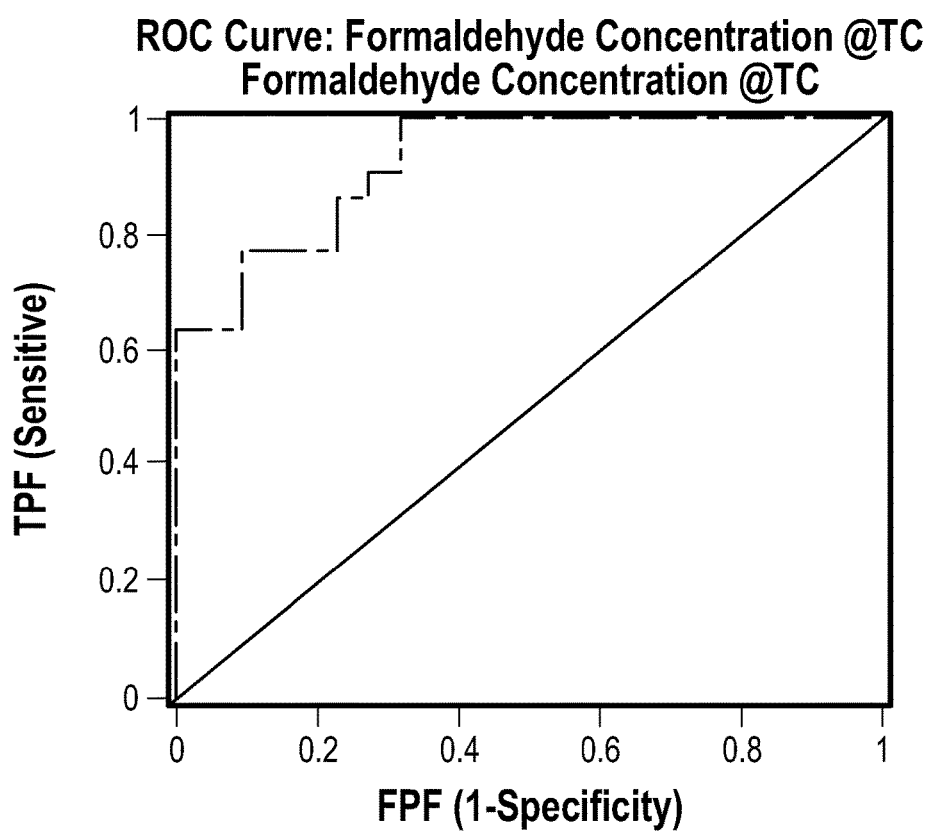
FIG. 20 shows a typical ROC curve of staining quality (based on sensitivity and specificity) based on formaldehyde concentration at the tissue sample center.

FIG. 20 shows an ROC curve of staining quality (sensitivity and specificity) based on formaldehyde concentration at the tissue sample center. The AUC in this case is 0.9256, which demonstrates the superiority of using formaldehyde concentration at tissue center as a predictor of stain quality in comparison with use of percent diffused at tissue center as a predictor of stain quality (AUC-0.8926) as was shown in FIG. 15.

Figure 21:
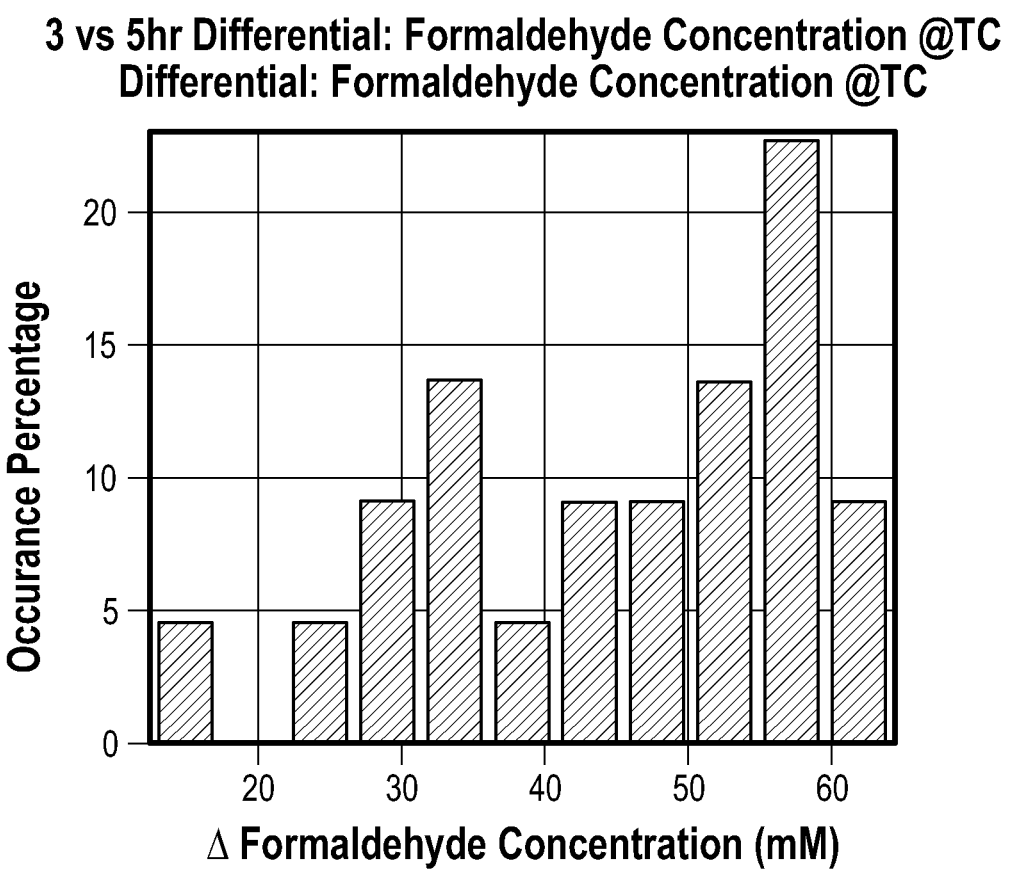
FIG. 21 shows a typical graph of the differential in formaldehyde concentration at the tissue sample center between 3 hours and 5 hours of immersion in an NBF solution.

Likewise, FIG. 21 demonstrates the superiority of reagent concentration at tissue center as a predictor of stain quality. It shows a graph of the differential in formaldehyde concentration at the tissue sample center between about 3 hours and about 5 hours of immersion in an NBF solution. Overall, the average difference seen in concentration is 45 mM. Compared to the difference in percent diffused (24%; FIG. 16), the difference in concentration at tissue center between about 3 about and about 5 about is more dramatic at about 33% (45 mM/137 mM x 100%) reflecting the differences in reagent concentration occurring late in an immersion that can have an effect on staining quality at the tissue center. Again, this demonstrates the advantage of using a method that provides a measure (in this case concentration) that is location and time specific within the sample volume, as opposed to an average measure across the entire sample volume (as in the case of a percent diffused measurement alone).

Figure 22:
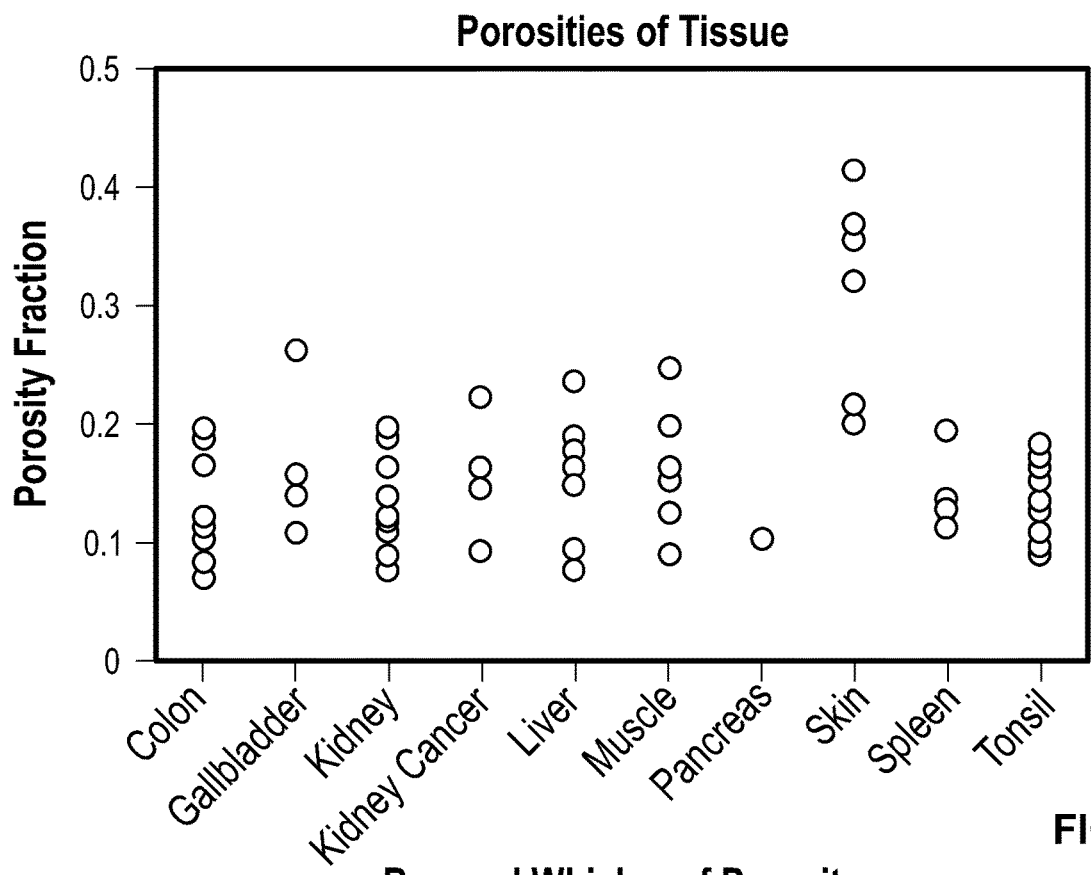
FIG. 22 shows the distributions of raw porosities for several tissue types as determined according to a disclosed embodiment.
Figure 23:
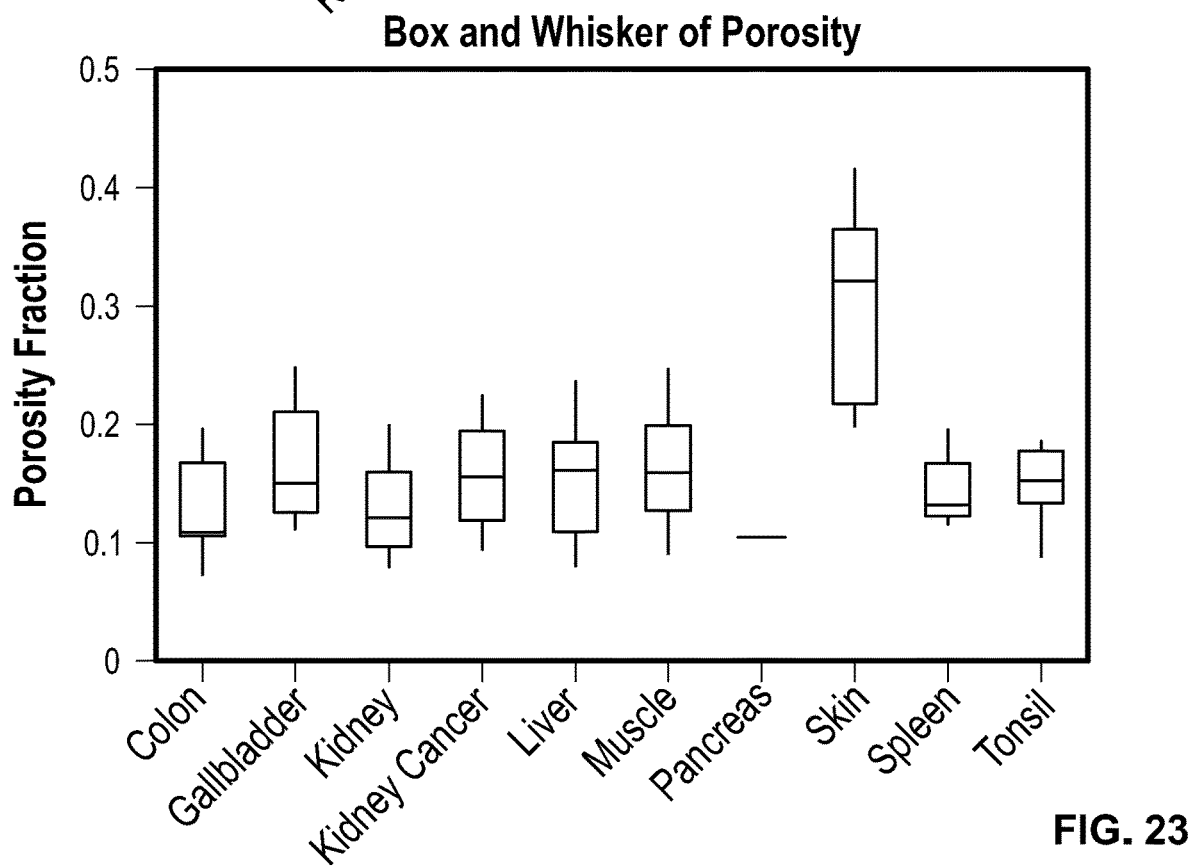
FIG. 23 shows a set of box and whisker distributions of porosities for several tissue types as determined according to a disclosed embodiment.

Having established the disclosed method could be used to determine a porosity for tonsil tissue, porosities were measured for 10 different tissue types (80 samples), and the results are shown in FIG. 22, which shows the distributions of raw porosities for the several tissue types. FIG. 23 shows a set of box and whisker distributions of porosities for the several tissue types. As can be seen, for most tissue types, the average porosity (line in box) is between about 0.1 and about 0.2, whereas skin has a much higher porosity of more than about 0.3.

Figure 24:
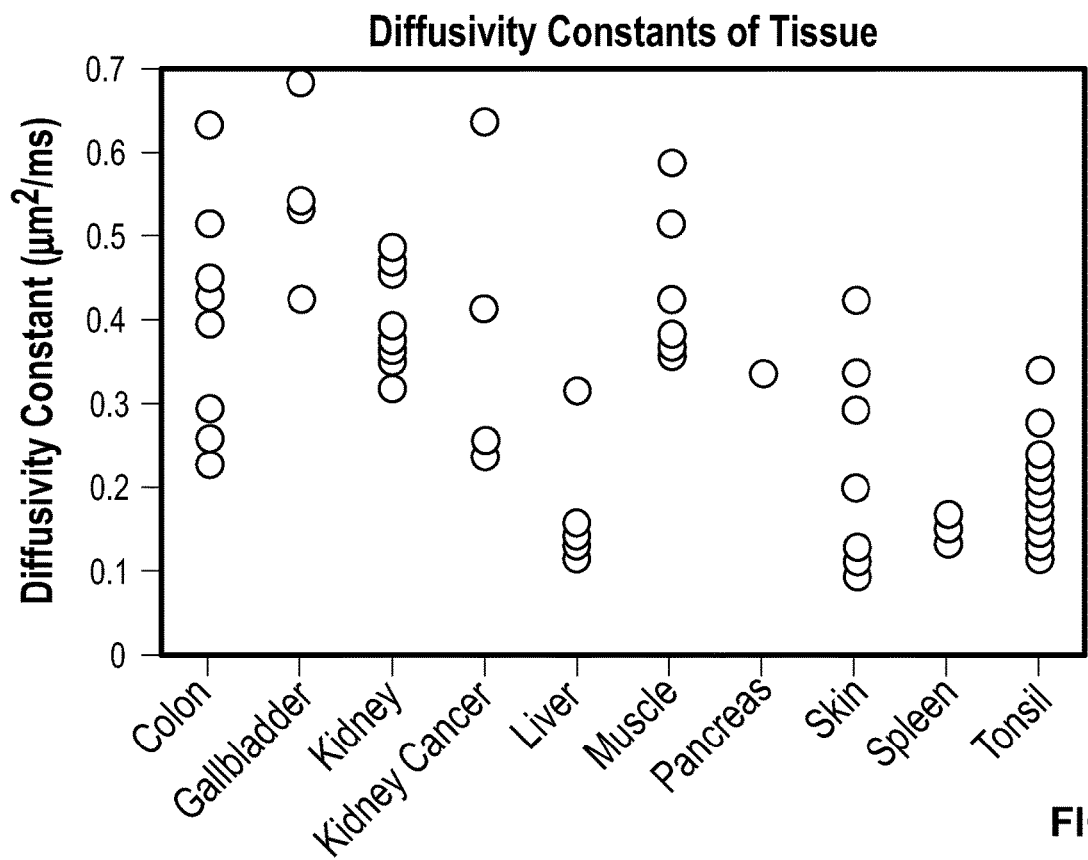
FIG. 24 shows the distributions of diffusivity constants for several tissue types.
Figure 25:
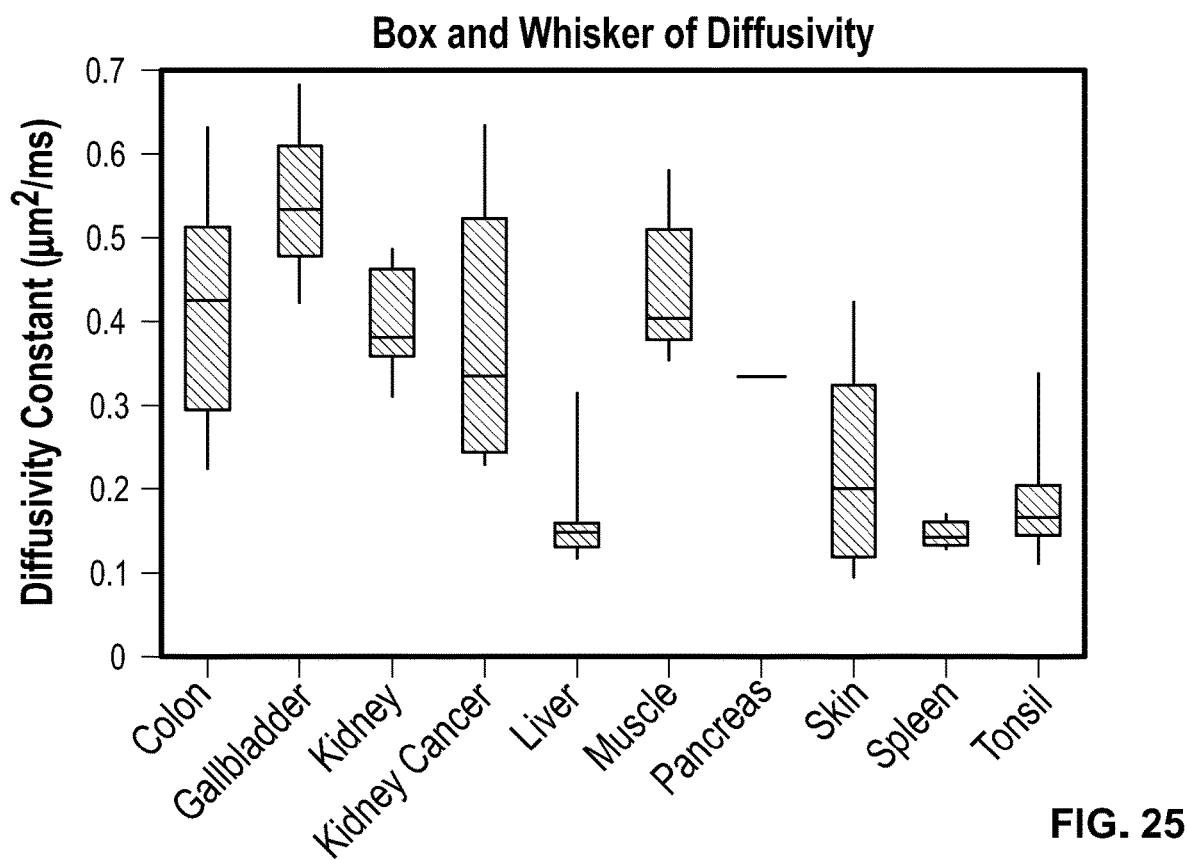
FIG. 25 shows a set of box and whisker distributions of diffusivity constants for several tissue types.

For comparison, FIG. 24 shows the distributions of the determined diffusivity constants for the several tissue types, and FIG. 25 shows a set of box and whisker distributions of the diffusivity constants for the several tissue types. In comparison to the average porosities determined among the several tissue types, the diffusivity constant is more variable.

Figure 26:
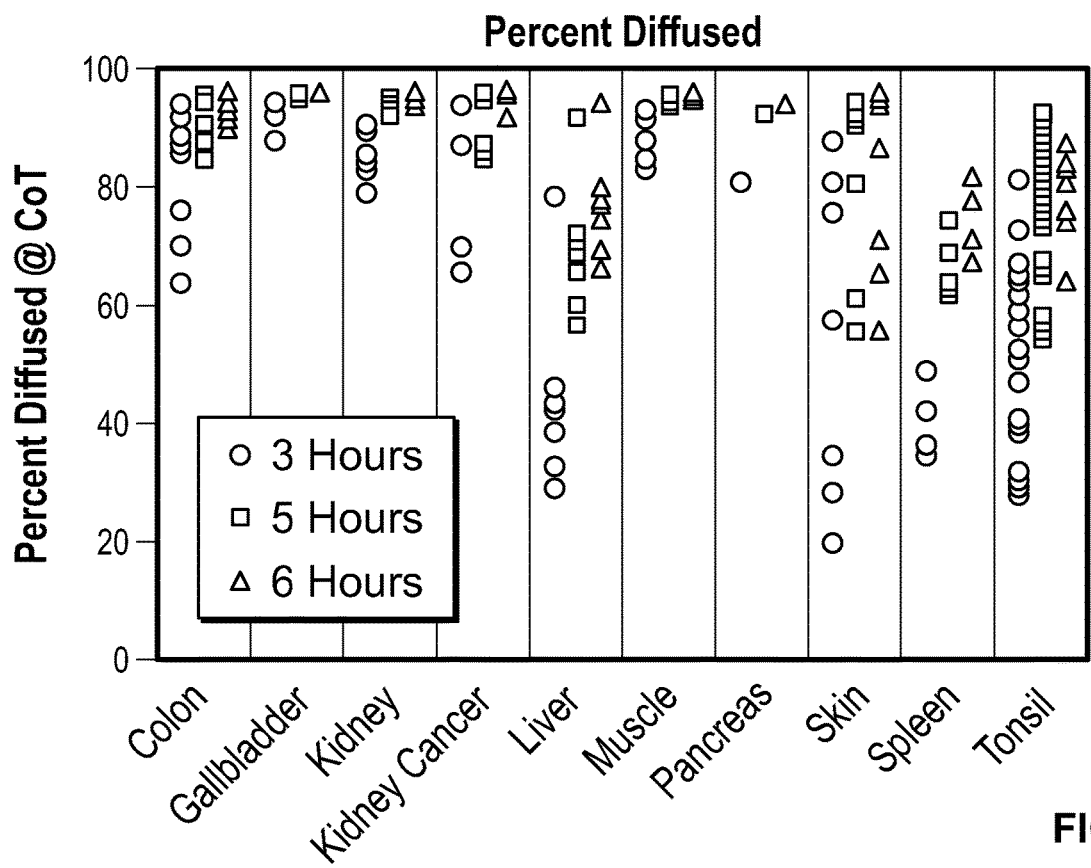
FIG. 26 shows the distributions of raw percent diffusion at the tissue sample center at 3, 5 and 6 hours for several tissue types.
Figure 27:
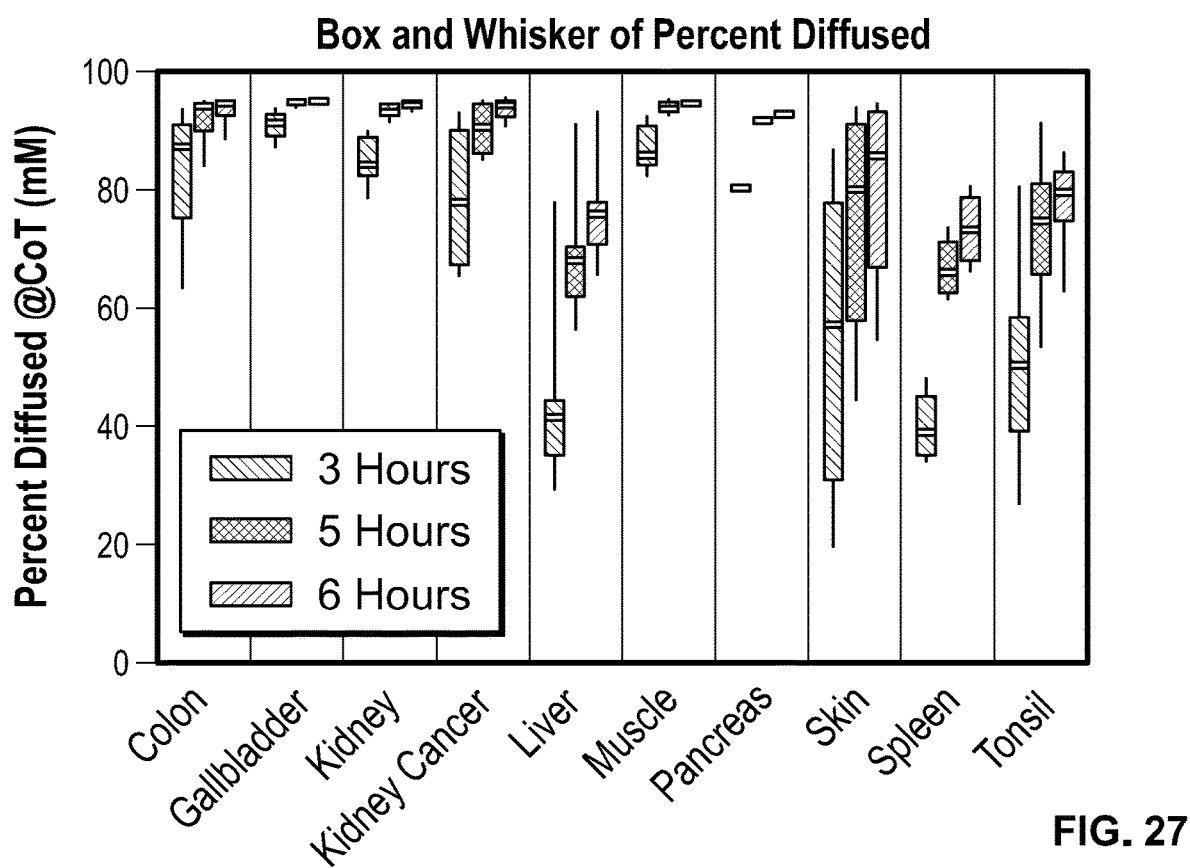
FIG. 27 shows a set of box and whisker distributions of percent diffusion at the tissue sample center at 3, 5 and 6 hours for several tissue types.
Figure 28:
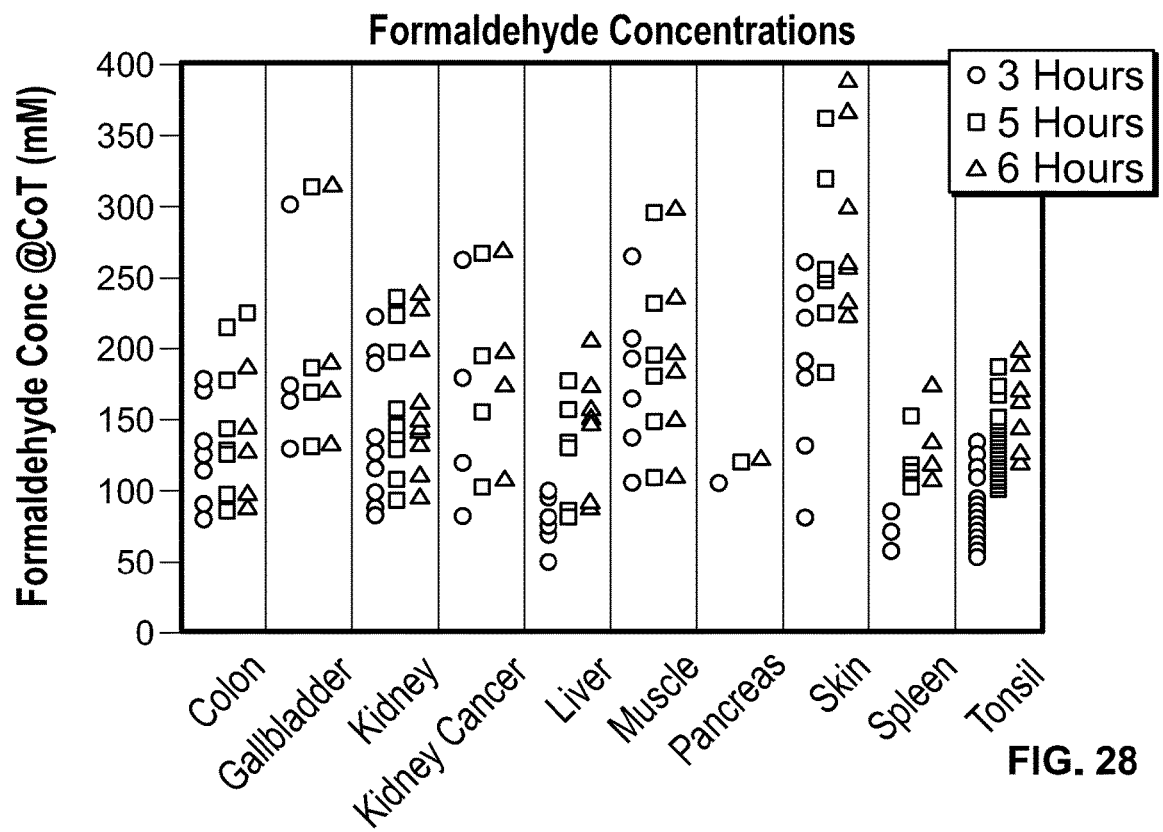
FIG. 28 shows the distributions of raw formaldehyde concentrations at the tissue sample center at 3, 5 and 6 hours for several tissue types.
Figure 29:
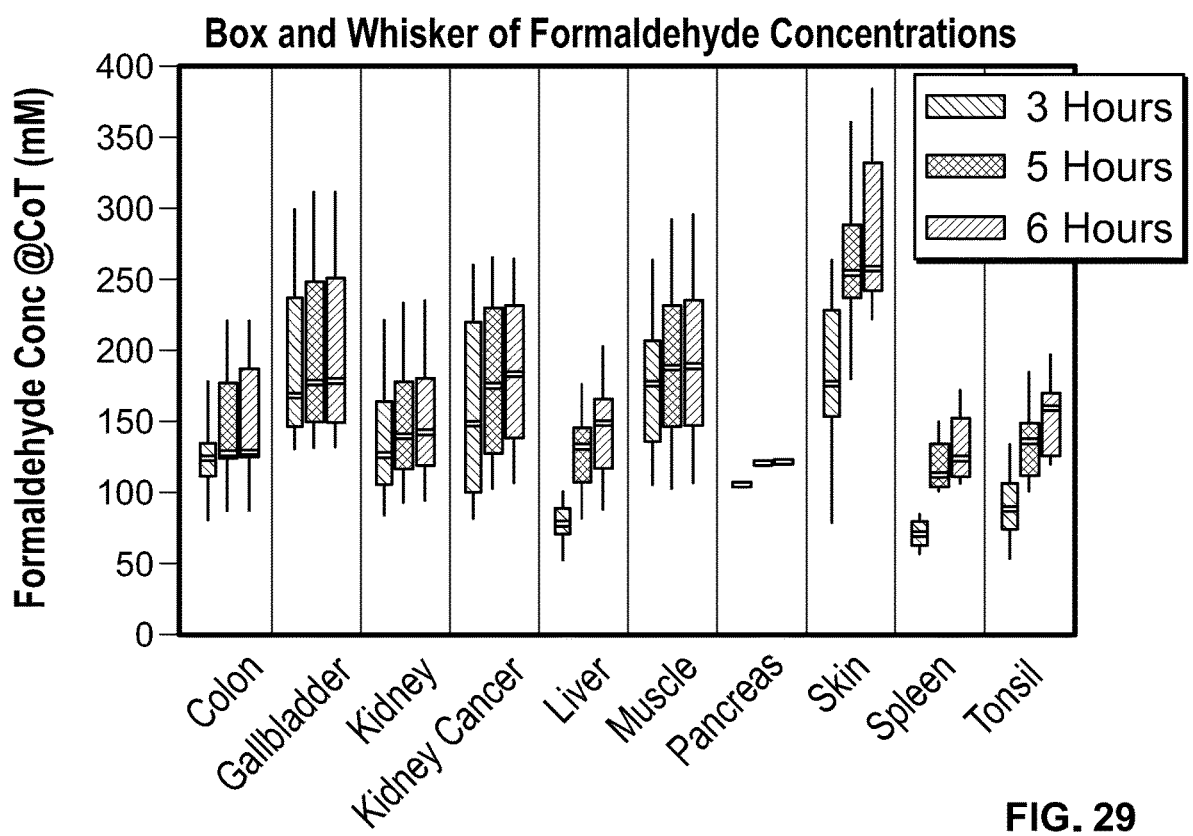
FIG. 29 shows a set of box and whisker distributions of formaldehyde concentration at the tissue sample center at 3, 5 and 6 hours for several tissue types.

FIG. 26 shows the distributions of raw percent diffusion at the tissue sample center at 3, 5 and 6 hours determined for the several tissue types, and FIG. 27 shows a set of box and whisker distributions of percent diffusion at the tissue sample center at 3, 5 and 6 hours for the several tissue types. FIG. 28 shows the distributions of raw formaldehyde concentration as determined at the tissue sample center at 3, 5 and 6 hours for several tissue types, and FIG. 29 shows a set of box and whisker distributions of formaldehyde concentration at the tissue sample center at 3, 5 and 6 hours for several tissue types. From a comparison of the raw data and box-and-whisker distributions based on measuring percent diffusion and those based on determining reagent concentration at the center of the tissue, it can be seen that the data tend to cluster more tightly when concentration is utilized.

Figure 30:
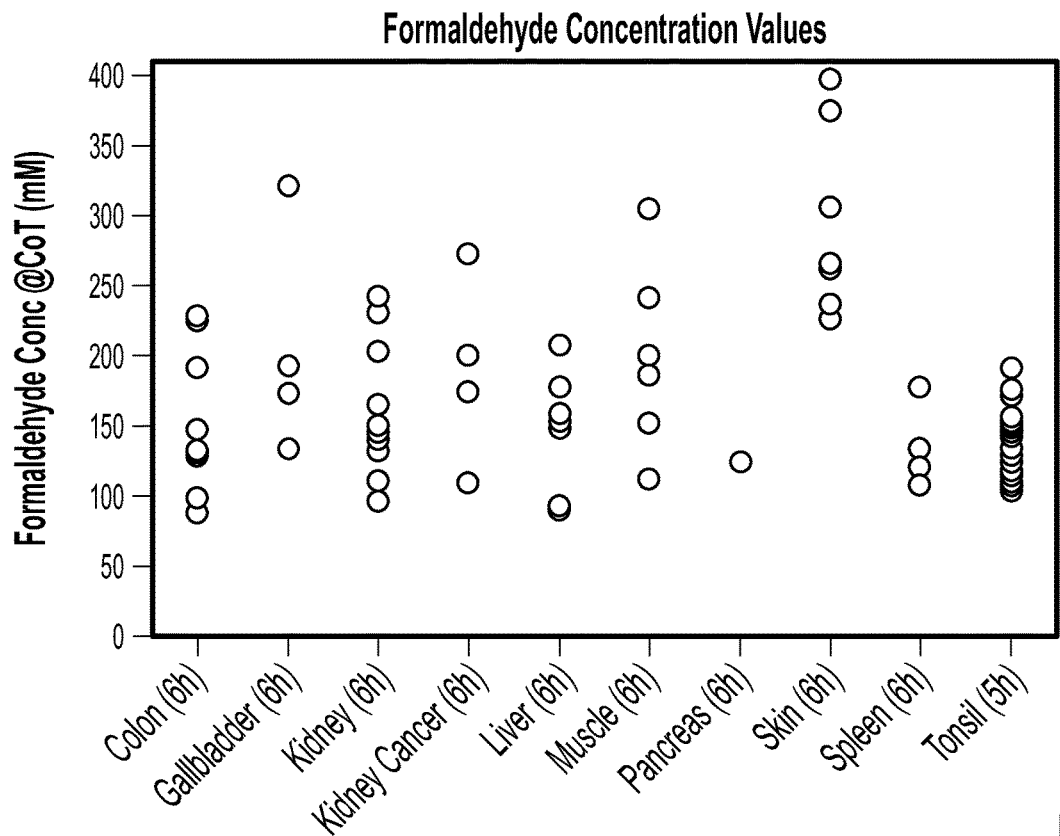
FIG. 30 shows distributions of raw formaldehyde concentrations at the tissue sample center for several tissue types after the indicated immersion times.
Figure 31:
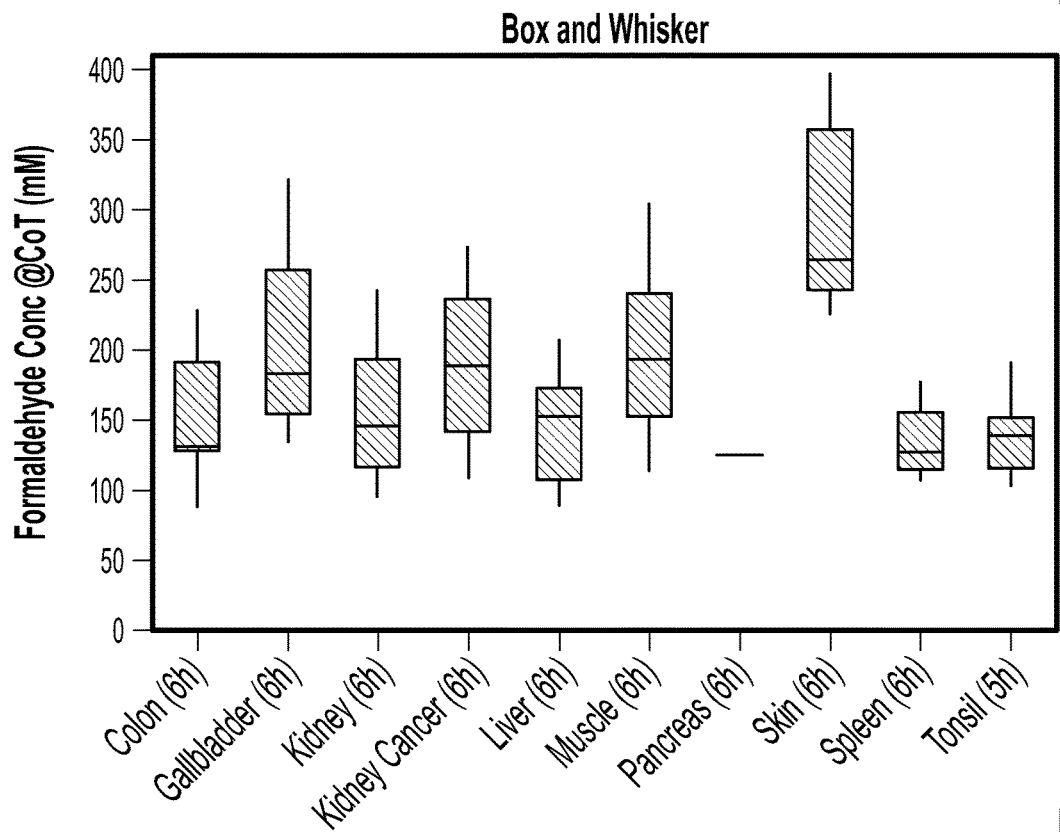
FIG. 31 shows a set of box and whisker distributions of formaldehyde concentration at the tissue sample center for several tissue types after the indicated immersion times.
Figure 32:
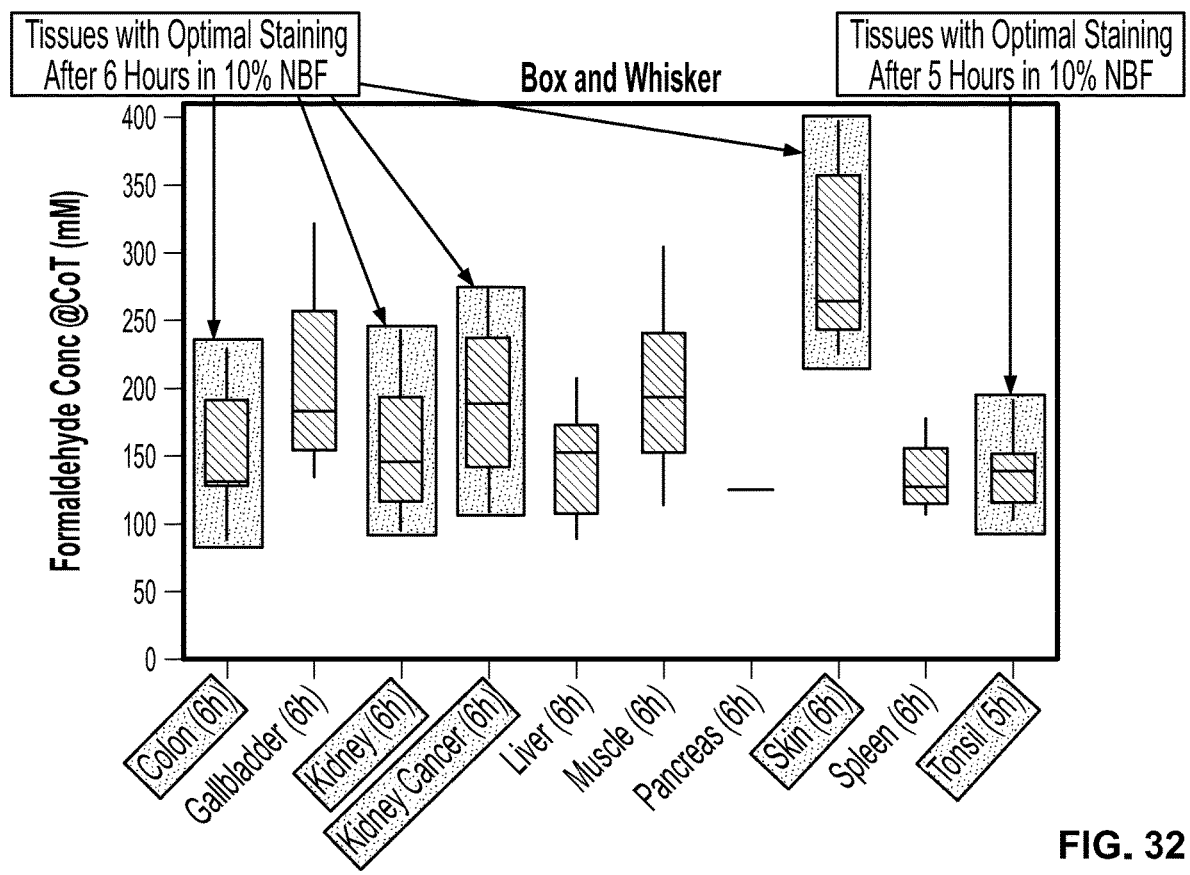
FIG. 32 shows a labeled version of FIG. 31, dividing tissue types that provide optimal staining after either 5 or 6 hours of immersion in about 10% NBF.

FIG. 30 shows distributions of raw formaldehyde concentrations at the tissue sample center for the several tissue types after the indicated immersion times, and FIG. 31 shows a set of box and whisker distributions of formaldehyde concentrations at the tissue sample center for the several tissue types after the indicated immersion times. These results confirm the correlation of tissue center formaldehyde concentrations above about 90 mM (such as above 100 mM) with "ideal" staining since earlier studies showed that fixation for at least 6 hours (5 hours for tonsil) in a cold step of a cold+hot fixation protocol ensures "ideal" staining. The results were further confirmed through microscopic analysis, with qualified readers determining the tissues indicated in FIG. 32 indeed demonstrated "ideal (optimal)" staining after the indicated times.

Figure 33:
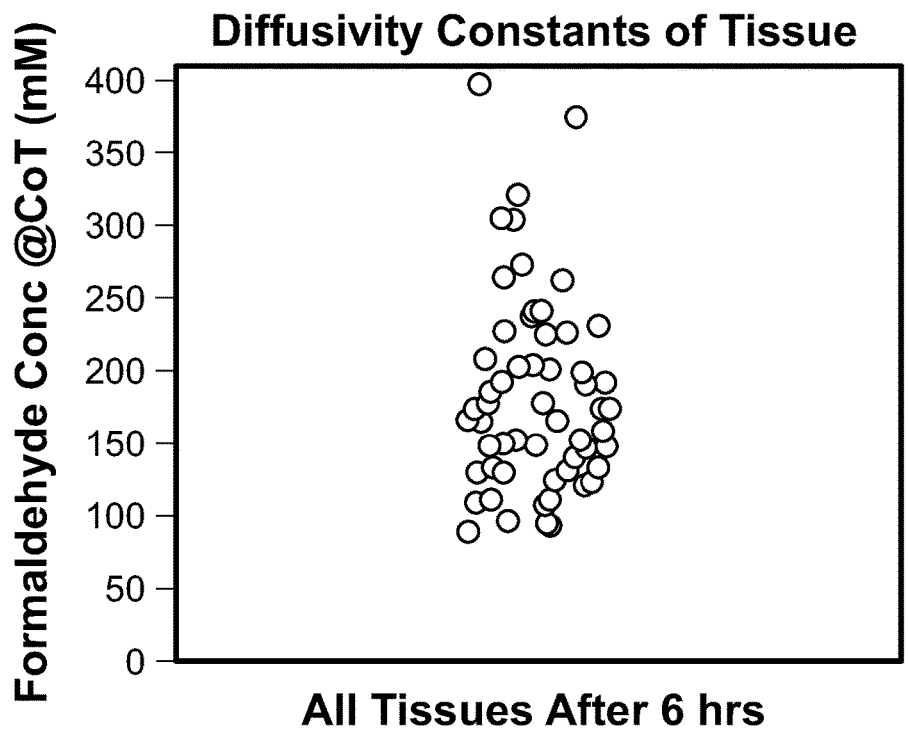
FIG. 33 shows the raw distribution of formaldehyde concentration at the tissue sample center for all tissues after 6 hours of immersion in about 10% NBF.
Figure 34:
FIG. 34 show the box and whisker distribution of formaldehyde concentration at the tissue sample center for all tissues after 6 hours of immersion in about 10% NBF.

FIG. 33 shows the raw distribution of formaldehyde concentration at the tissue sample center across all tissues types after 6 hours of immersion in 10% NBF, and FIG. 34 show the box and whisker distribution of formaldehyde concentration at the tissue sample center for all tissues after 6 hours of immersion in 10% NBF. The 90 mM (or 100 mM) formaldehyde concentration level for achievement of "ideal staining" is confirmed across all tissue types. The difference between calculating formaldehyde concentration at the center of the tissue based on TOF data and simply using a standard fixation time protocol is that while a 6 hour immersion might not be sufficient to achieve ideal staining for sample larger than 6 mm in diameter, a time sufficient to achieve at least 90 mM (or 100 mM) formaldehyde at the tissue center will ensure "ideal" staining of the sample. Conversely, smaller samples (e.g. needle core biopsies) that could be potentially be over-fixed using a standard fixation time of 6 hours can be treated only until the concentration at tissue center reaches at least 90 mM, thus leading to a shorter overall analysis time.

Figure 35:
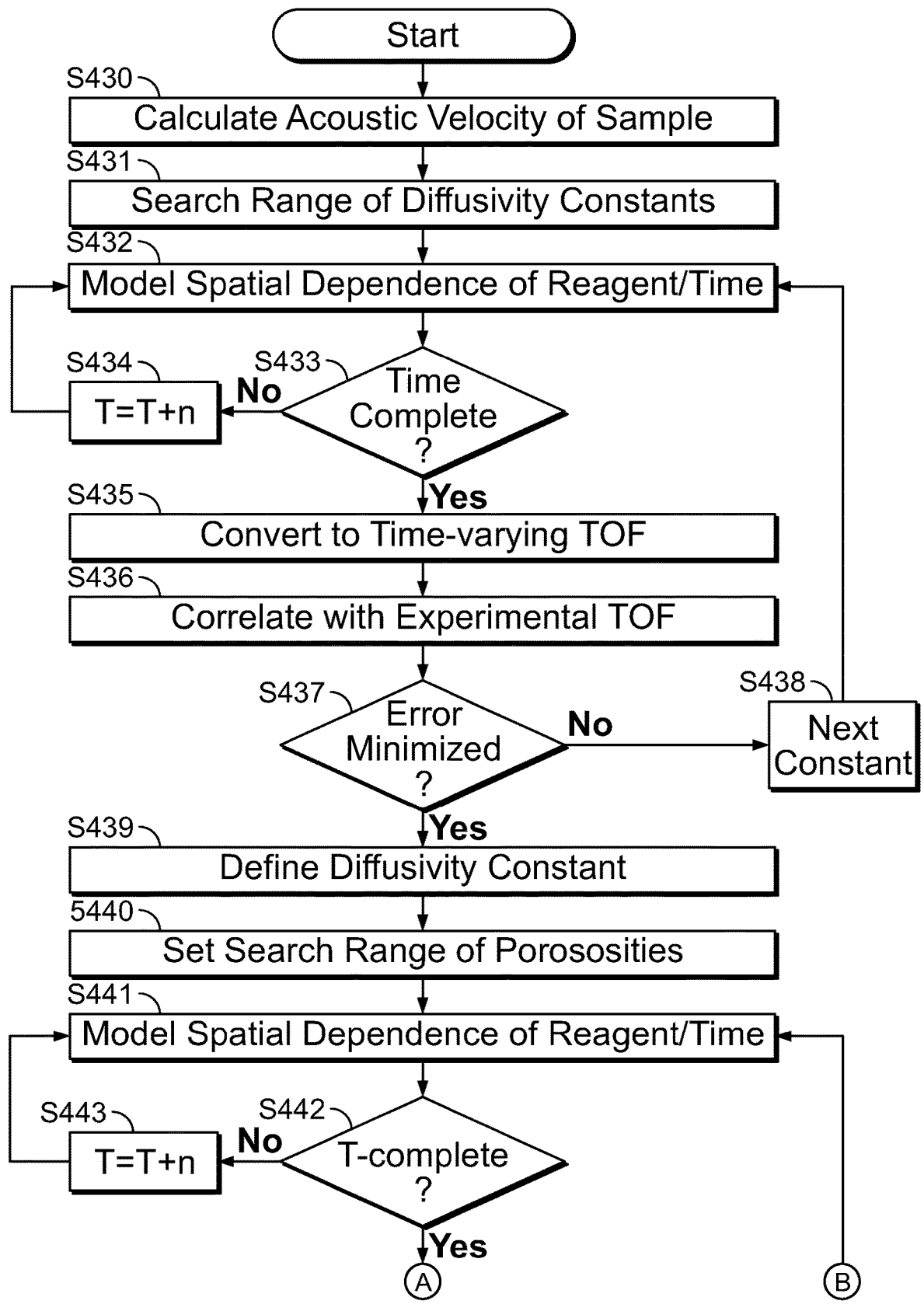
FIG. 35 shows a method for obtaining a diffusivity coefficient, a porosity, and formaldehyde concentration at the tissue sample center.
Figure 35:
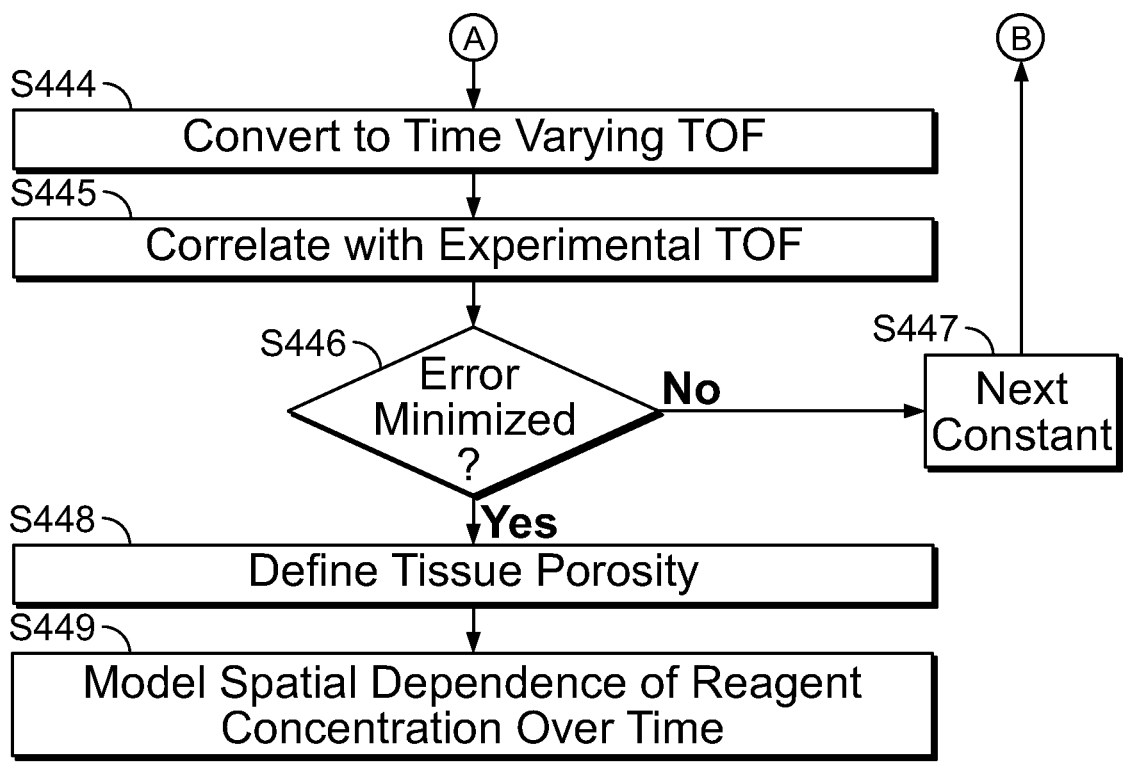

FIG. 35 shows an embodiment of the disclosed method for obtaining a diffusivity coefficient, a porosity, and formaldehyde concentration at the tissue sample center. At S430 the acoustic velocity of the sample is measured as was previously described in the context of FIG. 3. Also like the embodiment of FIG. 3, operations and decisions S431, S432, S433, S434, S435, S436, S437 and S438 are performed to define the diffusivity constant. Once the diffusivity constant is determined at S439, a range of porosities that are used to model the diffusion of the reagent solution into the sample is set at S440. The range can be set by default or entered by a user. For example, based on the experimentally determined porosity values discussed above in regard to FIG. 22, to a range of 0.05 to 0.50 (or a narrower) should cover most, if not all, tissue types. A narrower range can be set when the tissue type has been examined prior, and for example, the user can enter the tissue type to provide an appropriate range of values for the model to explore. At S441, S442 and S443, the diffusivity constant from S439 and a candidate porosity set at S440, are used to model the spatial dependence of the reagent over a series of time points T to T+n. The model built over the series of time points is then used to generate an expected TOF curve at S444 and correlated with the experimental TOF curve at S445. At S446, the error between the expected and experimental TOF curves is checked to see if it is at a minimum, and if so, the candidate tissue porosity is determined at S448 to be the actual tissue porosity. If not, the process is repeated with a second candidate porosity at S447. Once both the diffusivity constant (S439) and the porosity (S448) are defined, a spatial model of reagent concentration across time can be generated at S449. Once the spatial model of reagent concentration over time is established, the concentration at a particular point within the sample at a particular time, such as at sample center, can be extracted from the model.

IV. Further Embodiments

In a further aspect, the disclosure relates to a system including an acoustic monitoring device that detects acoustic waves having traveled through a porous material and a computing device communicatively coupled to the acoustic monitoring device 102. The computing device includes instructions which, when executed, cause the computing device to perform operations comprising:
  (i) computing a set of experimental TOFs from measured acoustic data of the detected acoustic waves, each experimental TOF indicating the TOF of acoustic waves that have traveled through a candidate diffusivity point of the porous material at a respective one of a plurality of time points; the candidate diffusivity point is a location in or at the surface of the porous material;
  (ii) setting a range of candidate diffusivity constants for the porous material;
  (iii) for each of the candidate diffusivity constants, simulating a spatial dependence concentration model of an expected concentration of a reagent within the porous material for the plurality of time points and for the candidate diffusivity point, the expected concentration of the reagent being a function of time, space and said candidate diffusivity constant;
  (iv) using the spatial dependence concentration model for computing a spatial dependence TOF model for the porous material, the TOF model assigning, to the candidate diffusivity point, for each of the plurality of time points and for each of the candidate diffusivity constants, a respectively modeled TOF; the expressions "modeled", "simulated" and "expected" are used herein interchangeably; for example, the "use" may consist of converting the spatial dependence concentration model to the spatial dependence TOF model; and (v) determining an error function for the candidate diffusivity point, the error being indicative of a distance (that may also be considered as and referred to as an "error") between each of the modeled TOFs assigned to said candidate diffusivity point from a corresponding experimental TOF, the experimental TOF having been measured by the acoustic monitoring device at the same time point as used for modeling its corresponding modeled TOF;

(vi) using the error function for identifying one or more modeled TOFs having minimum distances to the corresponding experimental TOFs;

(vii) outputting a diffusivity constant calculated for the porous material from the candidate diffusivity constants of the one or more identified modeled TOFs.

(viii) setting a range of candidate porosities for the porous material;

(ix) for each of the candidate porosities, simulating a spatial dependence concentration model of an expected concentration of a reagent within the porous material for the plurality of time points and outputted diffusivity constant, the expected concentration of the reagent being a function of time, space, diffusivity constant and the candidate porosity; and (x) determining an error function for the candidate porosity, the error being indicative of a distance (that may also be considered as and referred to as an "error") between each of the modeled TOFs assigned to said candidate porosity point from a corresponding experimental TOF, the experimental TOF having been measured by the acoustic monitoring device at the same time point as used for modeling its corresponding modeled TOF.

In a further aspect, the disclosure relates to a corresponding method.

According to other embodiments, the computing the spatial dependence TOF model comprises determining each of the modeled TOFs by solving a heat equation for the porous material.

According to particular embodiments, the acoustic data comprises: the velocity of the sound waves in the porous material prior to diffusion with the reagent; and/or the experimental TOFs of the acoustic waves through the porous material at the plurality of time points during diffusion of the reagent into the porous material; and/or experimental phase shift data for computing the experimental TOFs from the experimental phase shift data; and/or velocity of the sound waves in the reagent being free of the porous material; and/or a thickness of the porous material. For example, said thickness is determined, according to embodiments, using a pulse echo ultrasound.

According to other embodiments, the computation of the spatial dependence TOF model comprises:

(i) selecting a first one of a plurality of candidate diffusivity constants;

(ii) calculating an expected reagent concentration $c_{reagent}$ at each of the plurality of candidate diffusivity points in the porous material for each of the plurality of time points in dependence of the selected candidate diffusivity constant;

(iii) calculating an integrated reagent concentration $c_{detected}$ for each of the plurality of time points and for each of the candidate diffusivity constants by integrating the expected reagent concentration $c_{reagent}$ calculated for said time point and said candidate diffusivity constant over a radius of the porous material;

(iv) converting the integrated reagent concentration to a modeled TOF of the spatial dependence TOF model by computing a linear combination of the speed of the sound waves in the porous material prior to diffusion with the reagent and the speed of the sound waves in the reagent being free of the porous material; and (v) selecting a next one of the candidate diffusivity constants and repeating this step and the three previous steps for the next selected candidate diffusivity constant until a termination criterion is reached to arrive at the diffusivity constant of the sample (vi) selection a first one of a plurality of candidate porosities for the porous material (vii) calculating a second modeled TOF for the sample based on the diffusivity constant arrived at above and the first one of the plurality of candidate porosities (viii) selecting a next one of the candidate porosities for the porous material and repeating this step and the previous step until a termination criterion is reached to arrive at the porosity of the sample; and (ix) calculating an actual reagent concentration at each of the candidate diffusivity points in the porous material In summary, determination reagent concentrations with any sample material may be provided by calculating the speed of sound in a reagent at a given temperature, pressure, etc., determining the sample's thickness with standard pulse echo ultrasound, determining the absolute sound velocity in the undiffused sample via phase retardation of ultrasound, followed by generating the modeled TOF trend from the candidate diffusivity constant first simulating the spatial dependence of the reagent diffusion into the sample, summing the total reagent concentration detected by the ultrasound beam, converting the detected reagent concentration to the TOF differential, and repeating these steps for multiple diffusion times. Then, the modeled TOF trend is determined by repeating the spatial dependence simulation for a plurality of candidate diffusivity constants (such as in a range as provided by those known from literature) and calculating an error between the experimental and simulated TOF differentials at all times and for all diffusivity constants, resulting in an error function between the experimental and modeled TOF as a function of diffusivity constant. Calculating the true diffusivity constant as the minimum of the error function results in an output. Then, using the true diffusivity constant and a plurality of candidate porosities for the sample (such as selected from a range of expected tissue porosities) to generate a second modeled TOF trend over time, calculating a second error function between the second modeled TOF trend and the experimental TOF trend at all times, and calculating the true porosity of the sample as a minimum of second error function. The true porosity can then be input along with the true diffusivity constant back into the model for spatial dependence of reagent diffusion to obtain reagent concentrations at any spatial point at any time within a sample during the diffusion process. Alternatively, the reagent concentration in units of molarity at a particular spatial point at a particular time according to the following equation based on % Diffused at a particular time.

Reagent_concentration=(% diffused)(porosity)(g reagent/ L)(1 mole/MW of reagent)

Moreover, the subject disclosure applies to both biological and non-biological context, providing an ability to reconstruct the diffusivity constant of any substance based on the acoustic TOF curve. The disclosed methods are more sensitive and accurate when compared to prior art methods.

Although the disclosed operations provide fitting the TOF curve to a single exponential function comprising a summation of Bessel functions, a double exponential or quadratic function may be more appropriate, depending on the context. Therefore, the equation itself may change, while the novel features disclosed herein may maintain their inventive spirit and scope when read by a person having ordinary skill in the art.

Diffusivity constant and porosity calculations are known to be useful for many applications, including compositional analysis. The present systems and methods are contemplated to be used in any system that utilizes diffusivity constant and porosity measurements. In one specific embodiment, the present systems and methods are applied to the field of monitoring diffusion of fluids into porous materials.

In some embodiments, the porous material is a tissue sample. In many common tissue analysis methods, the tissue sample is diffused with a fluid solution. For example, Hine (Stain Technol. 1981 March;56(2):119-23) discloses a method of staining whole tissue blocks by immersing a tissue sample in a hematoxylin solution and eosin solution after fixation and prior to embedding and sectioning. Additionally, fixation is frequently performed by immersing an unfixed tissue sample into a volume of fixative solution, and the fixative solution is allowed to diffuse into the tissue sample. As demonstrated by Chafin et al., (PLoS ONE 8(1): e54138. doi:10.1371/journal.pone. 0054138 (2013)), a failure to ensure that a fixative has sufficiently diffused into the tissue can compromise the integrity of the tissue sample. Thus, in one embodiment, the present systems and methods are applied to determine a sufficient time of diffusion of a fixative into a tissue sample. In such a method, the user selects a minimum fixative concentration to be achieved at a particular point in the tissue sample (such as the center of the thickness of the tissue sample). Knowing at least the tissue thickness, tissue geometry, and the calculated true diffusivity a minimum time to reach the minimum relative (to the surrounding fluid) fixative concentration at the center of the tissue sample can be determined. The fixative will thus be allowed to diffuse into the tissue sample for at least said minimum time. However, to extend this to methods that can be used for real-time monitoring, determination of the tissue sample porosity as disclosed herein permits determination of an actual fixative concentration that needs to be achieved to ensure sample integrity. Thus, based on the system and method disclosed herein, other techniques such as radiolabel tracing, mid-IR evaluation and MRI can be used to determine appropriate times for particular treatments with particular reagents, such as fixatives.

In some embodiments, the systems and methods disclosed herein are used in connection with a two-temperature immersion fixation method on a tissue sample. As used herein, a "two-temperature fixation method" is a fixation method in which tissue is first immersed in cold fixative solution for a first period of time, followed by heating the tissue for the second period of time. The cold step permits the fixative solution to diffuse throughout the tissue without substantially causing cross-linking. Then, once the tissue has adequately diffused throughout the tissue, the heating step leads to cross-linking by the fixative. The combination of a cold diffusion followed by a heating step leads to a tissue sample that is more completely fixed than by using standard methods. Thus, in an embodiment, a tissue sample is fixed by: (1) immersing an unfixed tissue sample in a cold fixative solution and monitoring diffusion of the fixative into the tissue sample by monitoring TOF in the tissue sample using the systems and methods as disclosed herein (diffusion step); and (2) allowing the temperature of the tissue sample to raise after a threshold TOF has been measured (fixation step). In exemplary embodiments, the diffusion step is performed in a fixative solution that is below 20° C., below 15° C., below 12° C., below 10° C., in the range of about 0° C. to about 10° C., in the range of about 0° C. to about 12° C., in the range of about 0° C. to about 15° C., in the range of about 2° C. to about 10° C., in the range of about 2° C. to about 12° C., in the range of about 2° C. to about 15° C., in the range of about 5° C. to about 10° C., in the range of about 5° C. to about 12° C., or in the range of about 5° C. to 1 about 5° C. In exemplary embodiments, the environment surrounding the tissue sample is allowed to rise within the range of about 20° C. to about 55° C. during the fixation step. In certain embodiments, the fixative is an aldehyde-based cross-linking fixative, such as glutaraldehyde- and/or formalin-based solutions. Examples of aldehydes frequently used for immersion fixation include:

formaldehyde (standard working concentration of 5-10% formalin for most tissues, although concentrations as high as 20% formalin have been used for certain tissues);

glyoxal (standard working concentration 17 to 86 mM);

glutaraldehyde (standard working concentration of 200 mM).

Aldehydes are often used in combination with one another. Standard aldehyde combinations include 10% formalin+1% (w/v) Glutaraldehyde. Atypical aldehydes have been used in certain specialized fixation applications, including: fumaraldehyde, 12.5% hydroxyadipaldehyde (pH 7.5), 10% crotonaldehyde (pH 7.4), 5% pyruvic aldehyde (pH 5.5), 10% acetaldehyde (pH 7.5), 10% acrolein (pH 7.6), and 5% methacrolein (pH 7.6). Other specific examples of aldehyde-based fixative solutions used for immunohistochemistry are set forth in Table 1:

TABLE 1

| Solution | Standard Composition |
| --- | --- |
| Neutral Buffered Formalin | 5-20% formalin + phosphate buffer (pH ~6.8) |
| Formal Calcium | 10% formalin + 10 g/L calcium chloride |
| Formal Saline | 10% formalin + 9 g/L sodium chloride |
| Zinc Formalin | 10% formalin + 1 g/L zinc sulphate |
| Helly's Fixative | 50 mL 100% formalin + 1 L aqueous solution containing 25 g/L potassium dichromate + 10 g/L sodium sulfate + 50 g/L mercuric chloride |
| B-5 Fixative | 2 mL 100% formalin + 20 mL aqueous solution containing 6 g/L mercuric chloride + 12.5 g/L sodium acetate (anhydrous) |
| Hollande's Solution | 100 mL 100% formalin + 15 mL Acetic acid + 1 L aqueous solution comprising 25 g copper acetate and 40 g picric acid |
| Bouin's Solution | 250 mL 100% formalin + 750 mL saturated aqueous picric acid + 50 mL glacial acetic acid |

In certain embodiments, the fixative solution is selected from Table 1. In some embodiments, the aldehyde concentration used is higher than the above-mentioned standard concentrations. For example, a high-concentration aldehyde-based fixative solution can be used having an aldehyde concentration that is at least 1.25-times higher than the standard concentration used to fix a selected tissue for immunohistochemistry with a substantially similar composition. In some examples, the high-concentration aldehyde-based fixative solution is selected from: greater than 20% formalin, about 25% formalin or greater, about 27.5% formalin or greater, about 30% formalin or greater, from about 25% to about 50% formalin, from about 27.5% to about 50% formalin, from about 30% to about 50% formalin, from about 25% to about 40% formalin, from about 27.5% to about 40% formalin, and from about 30% to about 40% formalin. As used in this context, the term "about" shall encompass concentrations that do not result in a statistically significant difference in diffusion at 4° C. as measured by Bauer et al., Dynamic Subnanosecond Time-of-Flight Detection for Ultra-precise Diffusion Monitoring and Optimization of Biomarker Preservation, Proceedings of SPIE, Vol. 9040, 90400B-1 (2014-Mar-20).

Two-temperature fixation processes are especially useful for methods of detecting certain labile biomarkers in tissue samples, including, for example, phosphorylated proteins, DNA, and RNA molecules (such as miRNA and mRNA). See PCT/EP2012/052800 (incorporated herein by reference). Thus, in certain embodiments, the fixed tissue samples obtained using these methods can be analyzed for the presence of such labile markers. Thus, in an embodiment, a method of detecting a labile marker is a sample is provided, said method comprising fixing the tissue according to a two-temperature fixation as disclosed herein and contacting the fixed tissue sample with an analyte binding entity capable of binding specifically to the labile marker, such as FOXP3. Examples of analyte-binding entities include: antibodies and antibody fragments (including single chain antibodies), which bind to target antigens; t-cell receptors (including single chain receptors), which bind to MHC: antigen complexes; MHC: peptide multimers (which bind to specific T-cell receptors); aptamers, which bind to specific nucleic acid or peptide targets; zinc fingers, which bind to specific nucleic acids, peptides, and other molecules; receptor complexes (including single chain receptors and chimeric receptors), which bind to receptor ligands; receptor ligands, which bind to receptor complexes; and nucleic acid probes, which hybridize to specific nucleic acids. For example, an immunohistochemical method of detecting a phosphorylated protein in a tissue sample is provided, the method comprising contacting the fixed tissue obtained according to the foregoing two-temperature fixation method with an antibody specific for the phosphorylated protein and detecting binding of the antibody to the phosphorylated protein. In other embodiments, an in situ hybridization method of detecting a nucleic acid molecule is provided, said method comprising contacting the fixed tissue obtained according to the foregoing two-temperature fixation method with a nucleic acid probe specific for the nucleic acid of interest and detecting binding of the probe to the nucleic acid of interest.

The foregoing disclosure of the exemplary embodiments of the present subject disclosure has been presented for purposes of illustration and description. It is not intended to be exhaustive or to limit the subject disclosure to the precise forms disclosed. Many variations and modifications of the embodiments described herein will be apparent to one of ordinary skill in the art in light of the above disclosure. The scope of the subject disclosure is to be defined only by the claims appended hereto, and by their equivalents.

Further, in describing representative embodiments of the present subject disclosure, the specification may have presented the method and/or process of the present subject disclosure as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present subject disclosure should not be limited to the performance of their steps in the order written, and one skilled in the art can readily appreciate that the sequences may be varied and still remain within the spirit and scope of the present subject disclosure.

The invention claimed is:

1. A method for fixing a tissue sample, comprising:
   immersing the tissue sample in a cold formalin solution until a point at the center of the tissue sample is determined to have a formaldehyde concentration of at least 90 mM, wherein the immersing of the tissue sample in the cold formalin solution is performed under conditions sufficient to diffuse the formaldehyde to the center point of the tissue sample; and
   contacting the tissue sample with a hot formalin solution once formaldehyde concentration at the point at the center of the tissue sample is determined to be above 90 mM for a time sufficient to form cross-links, thereby fixing the tissue sample;
wherein the cold formalin solution has a temperature of between about 0° C. and about 15° C., and
wherein the hot formalin solution has a temperature of between about 20° C. and about 55° C.

2. The method of claim 1, wherein the immersing in the cold formalin is conducted until the formaldehyde concentration at the point at the center of the tissue sample is determined to have a formaldehyde concentration of at least 100 mM; and wherein the contacting of the tissue with the hot formulation solution is performed after the concentration of formaldehyde at the point at the center of the tissue sample is determined to be above 100 mM.

3. The method of claim 1, wherein the cold formalin solution has a temperature of between about 2° C. and about 15° C.

4. The method of claim 1, wherein the contacting of the tissue sample with the hot formalin solution comprises raising the temperature of the cold formalin solution while the cold formalin solution remains in contact with the tissue sample.

5. The method of claim 1, wherein the formaldehyde concentration is determined by a method selected from time-of-flight ("TOF"), radio-label tracing, mid-infra-red ("IR") spectroscopy, and magnetic resonance.

* * * * *